(12) United States Patent
Decoux

(10) Patent No.: US 12,306,913 B2
(45) Date of Patent: May 20, 2025

(54) CERTIFIED TEXT DOCUMENT

(71) Applicant: SICPA HOLDING SA, Prilly (CH)

(72) Inventor: Eric Decoux, Vevey (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 17/616,387

(22) PCT Filed: May 28, 2020

(86) PCT No.: PCT/EP2020/064812
§ 371 (c)(1),
(2) Date: Dec. 3, 2021

(87) PCT Pub. No.: WO2020/245024
PCT Pub. Date: Dec. 10, 2020

(65) Prior Publication Data
US 2022/0318346 A1   Oct. 6, 2022

(30) Foreign Application Priority Data
Jun. 3, 2019   (EP) .................................... 19177919

(51) Int. Cl.
*G06F 21/16*  (2013.01)
*G06K 19/06*  (2006.01)
(Continued)

(52) U.S. Cl.
CPC ....... *G06F 21/16* (2013.01); *G06K 19/06075* (2013.01); *G07D 7/004* (2013.01)

(58) Field of Classification Search
CPC .......... H03M 13/1102; H03M 13/154; H03M 13/05; G06F 21/64; G06F 12/0813;
(Continued)

(56) References Cited

U.S. PATENT DOCUMENTS 6,047,093 A * 4/2000 Lopresti ................. G06V 30/12
382/310
2002/0035578 A1   3/2002 Stratigos et al.
(Continued)

FOREIGN PATENT DOCUMENTS

EP    2048867    4/2009
JP    9297867    11/1997
(Continued)

OTHER PUBLICATIONS

Cai, "Fraud detections for online businesses: a perspective from blockchain technology" (Year: 2016).*
(Continued)

*Primary Examiner* — Thien T Mai
(74) *Attorney, Agent, or Firm* — Muncy, Geissler, Olds & Lowe, P.C.

(57) ABSTRACT

The invention protects a content of a digital or physical document against forgery. It allows automatic detection of any modification in an arrangement of graphical symbols (e.g. a text) provided on a support (e.g. printed or displayed) with respect to an original verifiable arrangement by providing on the support reproducible verifiable data including a verification barcode, while eliminating redundancy between data inside the barcode and the graphical symbols, and resolving the problem of the size of the barcode when the size of the data for these graphical symbols is large.

8 Claims, 7 Drawing Sheets

(51) Int. Cl.
*G07D 7/004* (2016.01)
*G07D 7/0043* (2016.01)
*G07D 7/0047* (2016.01)

(58) Field of Classification Search
CPC ...... G06F 21/16; G06F 16/152; G06F 16/137; G06F 16/2246; G06F 16/2255; G06F 16/9014; G06F 16/9027; G06F 40/14; G06K 19/06037; G06K 19/06075; G07D 7/00; H04N 1/32133; H04N 2201/3233; H04N 1/32128; H04N 2201/3269; H04N 21/235; H04N 1/32144; H04N 21/8358; H04N 2201/3271; H04N 2201/327; H04N 2201/3277; H04N 2201/3266; H04N 2201/323
See application file for complete search history.

(56) References Cited

U.S. PATENT DOCUMENTS

| | | | |
|---|---|---|---|
| 2002/0164052 A1 | 11/2002 | Reed et al. | |
| 2004/0145661 A1 | 7/2004 | Murakami et al. | |
| 2004/0169366 A1* | 9/2004 | Duffell | H04N 1/32133 283/17 |
| 2008/0292136 A1 | 11/2008 | Ramani et al. | |
| 2009/0185713 A1 | 7/2009 | Koike | |
| 2015/0052615 A1* | 2/2015 | Gault | G06F 21/645 726/26 |
| 2017/0046536 A1 | 2/2017 | Maximov et al. | |

FOREIGN PATENT DOCUMENTS

| | | | |
|---|---|---|---|
| JP | 2003528368 | 9/2003 | |
| JP | 2009171432 | 7/2009 | |
| JP | 2018182487 | 11/2018 | |
| WO | WO-0055788 A2 * | 9/2000 | ............ G06Q 40/02 |
| WO | 2018224724 | 12/2018 | |

OTHER PUBLICATIONS

S. Goldwasser and M. Bellare "Lecture Notes on Cryptography", MIT, Jul. 2008, http://www-cse.ucsd.edu/users/mihir, 289 pages.
International Search Report and Written Opinion issued with respect to application No. PCT/EP2020/064812.
ABBYY® FineReader PDF 14 User's Guide, 2017, 281 pages.
Eurasian Office Action in counterpart Eurasian Application No. 202193140 dated Dec. 21, 2022 (and English language translation of Office Action), 6 pages.
Japanese Office Action in counterpart Japanese Patent Application No. 2021-570944 dated Jun. 4, 2024 (and English language translation of Office Action).
Chinese Office Action in counterpart Chinese Patent Application No. 202080041604.4 dated Jan. 24, 2025 and English language translation of Office Action.

* cited by examiner

CERTIFIED TEXT DOCUMENT

TECHNICAL FIELD

The present invention relates to the technical field of security and anti-fraud methods and systems. Particularly, the invention relates to the protection of data against forgery or tampering, like textual data of a value document (digitized or printed) for example.

BACKGROUND OF THE INVENTION

The problems of counterfeiting and tampering digital files or printed documents are well known, serious, and growing. The example of falsifying data marked on an original (digital or material) document such as an identity document or a diploma is well known, and the concern is even worse if considering a digital copy of the original (possibly genuine) digital/material document. Simply keeping track of identifiers such as serial numbers, or even including some digital watermarks, is in general a weak response, because counterfeiters can easily copy such numbers or digital watermarks as well.

There are many known techniques to protect a content of a digital or physical document against forgery. For example, by taking a hash of digital data from an original digital document, or from a digitized version of an original physical document (e.g. by scanning the document and extracting textual data via an OCR scanner software), and storing the hash value in a ledger (e.g. a mere database or a blockchain). Then, by scanning a data content of a document under scrutiny as visually represented on a physical support (for example, the support can be a sheet of paper on which data are printed) and calculating a hash value of said data content, and then comparing the calculated hash value with the hash value stored in the ledger corresponding to an original document, a change in the data content can be detected. However, a drawback of this method is that due to some alteration of the visual representation on the support of the document content, even if this document is genuine, the calculated hash value can differ from the stored hash value. This difference may as well be due to the way the scanning operation is performed, or even depend on the type of scanner used (two different scanners can give two opposite conclusions). This is also true for a digital document as displayed on a support like a screen (of a computer, for example): even if the document content is genuine, any alteration on the displayed content will generate, when the displayed content is scanned for verification, a hash value differing from the stored hash value. Thus, in practice, scanning a document and calculating a hash value of the capture image does not work because every time a document is scanned a different hash generally results. Using an OCR ("Optical Character Recognition") scanner before computing a hash value does not solve the above issue, as there is no OCR system that performs at 100%: e.g. if just a point becomes a comma, or a letter "l" (i.e. L) becomes a "1" (i.e. one), the computed hash will be different.

Some existing techniques for protecting paper documents (e.g. certificates, diplomas, contracts . . . ) with just few information extracted from the document involve creating a 2D barcode (e.g. a QR code), putting the extracted information inside the 2D barcode and printing it on the document. Each time the 2D barcode is read the same result is obtained, but with the drawback that the information included in the barcode must be compared with the information printed on the document. Moreover, in case one wants to protect for example a full text page, it is necessary to put the full text in the barcode and thus the barcode becomes enormous in size and requires much space on the page, which is perceived as disturbing by a reader (so that in practice the full text that can be encoded is limited in size), and it becomes necessary (and tedious) to compare several thousands of characters between the printed text and the text decoded from the barcode.

U.S. Pat. No. 6,047,093 A, EP 2 048 867 and US 2004/145661 are known to disclose determining errors in the text printed on a document and forming information thereon.

SUMMARY OF THE INVENTION

The invention is aimed at solving the above mentioned drawbacks of the prior art regarding counterfeiting and tampering digital files or printed documents, by allowing automatic detection of any modification in an arrangement of marked (resp. displayed) graphical symbols (e.g. a text) with respect to an original arrangement, and particularly eliminating redundancy between the data inside a code and a printed (resp. displayed) text, avoiding the burden of visually comparing a text inside a code with a printed (resp. displayed) text, while resolving the problem of the too large size of the code when the size of data for the printed (resp. displayed) text is large.

Thus, the present invention is aimed at providing a reliable and robust method for producing on a material support, like a display (e.g. a screen of a computer) or a substrate (e.g. a sheet of paper, a label, a packaging), visible graphical symbols (e.g. text characters or glyphs) of which conformity with authentic reference graphical symbols can be easily checked by a user reading said visible graphical symbols and that avoids the drawbacks of the prior art. The graphical symbols are human readable and are taken from a given finite set of graphical symbols (e.g. like text characters from an alphabet). The human readable graphical symbols, as displayed or marked on the substrate according to the invention, are thus verifiable by the user and any attempt to modify any part of the graphical symbols can be detected.

The invention thus relates to a "marking method", i.e. a method of generating on a support verifiable graphical data by using a given finite set of graphical symbols, the support being a display or a substrate, comprising the steps of:

storing in a memory of a processing unit a graphical data block containing a digital representation of graphical symbols;

processing with the processing unit the digital representation of graphical symbols of the stored graphical data block with an error correction code programmed in the processing unit to generate error correction data in a corresponding error correction data block;

formatting the graphical data block and the error correction data block with the processing unit to respectively provide, in a human readable graphical data block, a human readable representation of the graphical symbols of the graphical data block and, in a machine-readable error correction data block, a machine-readable representation of the error correction data of the error correction data block separate from the human readable representation of the graphical symbols of the graphical data block, to obtain a corresponding verifiable graphical data block comprising said human readable graphical data block and said machine-readable error correction data block; and (i) displaying human readable graphical symbols and corresponding machine-readable representation of error correction data of the obtained verifiable graphical data block on the display connected to the processing unit, or (ii) marking on the substrate, via a marking device connected to the processing unit and equipped with a control unit operable to control the operation of marking based on data received from the processing unit, human readable graphical symbols and corresponding machine-readable representation of error correction data of the verifiable graphical data block received from the processing unit, thereby providing on the support human readable graphical symbols together with corresponding machine-readable error correction data that are verifiable by a user.

The machine-readable representation of the error correction data may be any one of an alphanumeric representation or a barcode representation (1D barcode, or 2D barcode like, for example, a DataMatrix code or a QR code). Preferably, the barcode may be a conventional PDF417 linear barcode, which can be read by a simple linear scanner swept over the barcode. Preferably, the graphical symbols may be text characters and the finite set of graphical symbols an alphabet. Preferably, the marking device may a printer (e.g. an inkjet printer) and the substrate may be a sheet of paper or a label. Also preferably, the error correction code may be a Reed-Solomon error correction code.

In a first variant, the above marking method may comprise the further steps of:

calculating with a hash function programmed on the processing unit a hash value of the graphical data block, or the error correction data block, or any portion of a data block resulting from a concatenation of the graphical data block and the error correction data block; and storing the calculated hash value as a reference hash value in a ledger.

The hash function is a well-known example of a one-way function, i.e. a function easy to compute but hard to invert (see, for example, S. Goldwasser and M. Bellare "Lecture Notes on Cryptography", MIT, July 2008, www-cse.ucsd.edu/users/mihir). Preferably, the cryptographic hash function may be of the SHA-2 family, like the SHA-256 for example giving hash values of 256 bits size: this function is practically irreversible and collision resistant, that is, the probability that two different inputs will lead to the same output is negligible. Also preferably, the ledger may be a blockchain, which advantageously provides an immutable record of data. Optionally, there may be a further step of signing the calculated reference hash value with a signature private key, via the processing unit, to obtain a corresponding signed reference hash value, and storing, or further providing on the support, the signed reference hash value. With this option, a user having a public key corresponding to the private key can check that a signed reference hash value read on the support is genuine as being signed with the right private key.

In a second variant of the above marking method, the support comprises a plurality of parts and the verifiable graphical data block is split into a same plurality of verifiable graphical data sub-blocks, and the corresponding human readable graphical symbols and machine-readable representation of error correction data are accordingly spread together on corresponding parts of the support, by the following steps:

the graphical data block is split into a plurality of graphical data sub-blocks, and each graphical data sub-block is formatted to provide a human readable representation of its graphical symbols in a corresponding human readable graphical data sub-block;

for each graphical data sub-block, the digital representation of its graphical symbols is extracted and processed with the error correction code to generate corresponding error correction data in an error correction data sub-block;

each error correction data sub-block is formatted to provide in a corresponding machine-readable error correction data sub-block a machine-readable representation of corresponding error correction data separate from the human readable representation of graphical symbols of the corresponding human readable graphical data sub-block, to obtain a corresponding verifiable graphical data sub-block comprising said human readable graphical data sub-block and said machine-readable error correction data sub-block; and at step (i), displaying human readable graphical symbols and corresponding machine-readable representation of error correction data of each obtained verifiable graphical data sub-block on the display, or at step (ii), marking on the substrate, via the marking device, human readable graphical symbols and corresponding machine-readable representation of error correction data of each verifiable graphical data sub-block received by the control unit from the processing unit, thereby providing on the support, for each graphical data sub-block of the graphical data block, corresponding human readable graphical symbols together with corresponding machine-readable error correction data that are verifiable by a user.

This second variant of the marking method of generating verifiable graphical symbols on a support is particularly adapted to the case of a document of several pages of text (i.e. the support has a plurality of parts): the full text is split into a plurality of pieces, each piece of text corresponding to a page of text and thus, each page of the document provided on the support comprises a human readable representation of graphical symbols of a corresponding graphical data sub-block together with a separate machine-readable representation of error correction data of a corresponding error correction data sub-block (e.g. as a PDF417 barcode shown on FIG. 1).

In order to allow a user to further determine whether human readable graphical symbols and corresponding machine-readable error correction data sub-block read on the support (i.e. on the part of the support corresponding to a graphical data sub-block of the graphical data block) are authentic or not, the above second variant of the marking method may further comprise the features of one of the following two sub-variants.

According to a first sub-variant of the second variant of the marking method, a sub-block hash value is calculated via a hash function programmed on the processing unit for each graphical data sub-block, or the corresponding error correction data sub-block, or any portion of a data sub-block resulting from a concatenation of said graphical data sub-block and said error correction data sub-block;

for each sub-block hash value, a corresponding machine-readable representation of said sub-block hash value is calculated;

associated with each verifiable graphical data sub-block, the corresponding machine-readable representation of the sub-block hash value is further provided on the corresponding part of the support;

a reference aggregated hash value of all the sub-block hash values is determined as a concatenation of all the calculated sub-block hash values; and the reference aggregated hash value is stored in a ledger, thereby providing on the support, for each graphical data sub-block of the graphical data block, corresponding human readable graphical symbols together with corresponding machine-readable error correction data that are authenticatable by a user.

According to a second sub-variant of the second variant of the marking method, a sub-block hash value is calculated via a hash function programmed on the processing unit for each graphical data sub-block, or the corresponding error correction data sub-block, or any portion of a data sub-block resulting from a concatenation of said graphical data sub-block and said error correction data sub-block;

a reference aggregated hash value of all the sub-block hash values is determined as a root node value of a tree having the calculated sub-block hash values as leaf node values, the tree comprising nodes arranged according to a given nodes ordering in the tree, said tree comprising node levels from the leaf nodes to the root node, every non-leaf node value of the tree corresponding to a hash value of a concatenation of the respective node values of its child nodes according to a tree concatenation ordering, the root node value corresponding to a hash value of a concatenation of the node values of the nodes of a penultimate nodes level in the tree according to said tree concatenation ordering;

for each sub-block hash value, an associated sub-block verification path key is determined as a series of hash values of selected non-leaf nodes of the tree necessary to retrieve the root node value from said sub-block hash value;

a machine-readable representation of each sub-block verification path key is included, associated with the respectively corresponding graphical data sub-block and error correction data sub-block, in the verifiable graphical data sub-block, the verifiable graphical data sub-block being further formatted to provide a machine-readable representation of said sub-block verification path key separate from the human readable representation of the associated graphical data sub-block and the machine-readable representation of the associated error correction data sub-block; and (iii) the reference aggregated hash value is stored in a ledger, or (iv) making the reference aggregated hash value available to a user, thereby providing on the support, for each graphical data sub-block of the graphical data block, corresponding human readable graphical symbols together with corresponding machine-readable error correction data that are authenticatable by a user.

The invention also relates to a "verification method" corresponding to the above mentioned "marking method", i.e. a method of verifying human readable graphical symbols provided together with machine-readable representation of error correction data on a support, which have been generated according to the above mentioned method of generating verifiable graphical symbols on said support, comprising the steps of:

scanning with a scanner, equipped with an imaging unit, a scanner processing unit having a scanner memory and connected to a scanner display, human readable graphical symbols on the support to obtain, via image processing of the scanned human readable graphical symbols, a scanned graphical data block being a digital representation of said scanned human readable graphical symbols;

scanning with the scanner machine-readable representation of error correction data on the support to obtain, via machine-readable decoder programmed on the scanner processing unit, corresponding scanned error correction data in a scanned error correction data block, the scanned error correction data block being a digital representation of said scanned error correction data;

correcting the scanned graphical data block with an error correction code programmed on the scanner processing unit using the scanned error correction data of the scanned error correction data block to obtain a corresponding corrected scanned graphical data block; and (a) displaying a visual representation of the corrected scanned graphical data block as corresponding corrected human readable graphical symbols on the scanner display, or (b) indicating via the scanner whether the scanned graphical data block contains an error, or (c) storing scan result data specifying whether the scanned graphical data block contains an error in the scanner memory.

Thus, according to the invention, a user may directly visualize on the scanner display (option (a)) the original graphical symbols (e.g. the original text of a document), due to the correction of the scanned text, and then easily compare the displayed graphical symbols (i.e. corrected human readable graphical symbols) with the graphical symbols on the support and detect any alteration or fraud.

The scanner may be a specifically dedicated device or may be a mere smartphone equipped with a camera and having a programmed application operable to run on a processor of said smartphone and execute the steps of the above method of verifying graphical symbols and corresponding machine-readable error correction data provided on a support. Some of the steps of the verification method may as well be executed on a distant server in communication with the scanner: for example, the scanner may send the scanned graphical data block and machine-readable error correction data to the server, suitably programmed processing means of the server may then execute the steps of obtaining corresponding scanned error correction data, correcting the scanned graphical data block (with an error correction code programmed on the server) using the scanned error correction data to obtain a corresponding corrected scanned graphical data block, and sending the corrected scanned graphical data block to the scanner (possibly with an indication whether the scanned graphical data block contains an error, or storing scan result data specifying whether the scanned graphical data block contains an error on the server).

A first variant of the above verification method, wherein the human readable graphical symbols and the machine-readable error correction data on the support have been generated according to the first variant of the marking method, the hash function being programmed on the scanner processing unit, and the scanner being connected to a scanner communication unit operable to communicate via a communication link with the ledger, comprises the further steps of:

calculating, according to the first variant of the marking method with the hash function programmed on the scanner processing unit, a scan hash value of the corrected scanned graphical data block, or the scanned error correction data block, or any portion of a data block resulting from a concatenation of the corrected scanned graphical data block and the scanned error correction data block;

obtaining the reference hash value stored in the ledger via the scanner communication unit and the communication link, and checking whether the obtained reference hash value matches the scan hash value; and (e) indicating a result of the checking operation, or (f) storing a result of the checking operation in the scanner memory.

Thus, even if a single bit of data has been modified in the data originally provided on the support, the scan hash value will strongly differ from the reference hash value and the modification will be detected.

In a second variant of the above verification method, wherein the human readable graphical symbols and the machine-readable error correction data on the support have been generated according to the second variant of the marking method, the operation of scanning the human readable graphical symbols on the support comprises scanning of the sub-block graphical symbols of the corresponding graphical data sub-block to obtain via image processing corresponding scanned graphical data sub-block as a digital representation of the scanned sub-block graphical symbols;

the operation of scanning the machine-readable error correction data on the support comprises scanning of the error correction data of the corresponding error correction data sub-block to obtain corresponding scanned error correction data sub-block;

the operation of correcting the scanned graphical data block comprises correcting the graphical data of the scanned graphical data sub-block, using the corresponding scanned error correction data sub-block, to obtain corresponding corrected scanned graphical data sub-block; and the operation (a) of displaying a visual representation of the corrected scanned data block comprises displaying a visual representation of the corrected scanned graphical data sub-block;

the operation (b) of indicating whether the scanned graphical data block contains an error comprises indicating whether the scanned graphical data sub-block contains an error;

the operation (c) of storing scan result data comprises storing whether the scanned graphical data sub-block contains an error.

A first sub-variant of the second variant of the verification method, wherein the human readable graphical symbols and the machine-readable error correction data on the support have been generated according to the first sub-variant of the second variant of the marking method, the hash function and the error correction code are programmed on the scanner processing unit, and the scanner is further operable to read and decode machine-readable representation of a sub-block hash value on the support via the scanner processing unit, the scanner is connected to a scanner communication unit operable to communicate via a communication link with the ledger, comprises the further steps of:

calculating for each part of the support, with the hash function programmed on the scanner processing unit and in accordance with the operations carried out for calculating a sub-block hash value, a scan sub-block hash value of the corresponding corrected scanned graphical data sub-block, or the corresponding scanned error correction data sub-block, or any portion of a data sub-block resulting from a concatenation of said corrected scanned graphical data sub-block and said scanned error correction data sub-block;

in case it is not possible to calculate a scan sub-block hash value for a part of the support, scanning and decoding a machine-readable representation of a sub-block hash value on said part of the support to obtain a corresponding decoded sub-block hash value, and using this decoded sub-block hash value as scan sub-block hash value for this part of the support;

calculating an aggregated scan hash value as a concatenation of all the scan sub-block hash values;

obtaining the reference aggregated hash value stored in the ledger via the scanner communication unit and the communication link, and checking whether the obtained reference aggregated hash value matches the aggregated scan hash value; and indicating a result of the checking operation via the scanner.

This first sub-variant of the second variant of the marking method allows to check authenticity of graphical symbols of all the readable parts of a support, even is some part(s) is not readable (e.g. due to severe alteration of the graphical symbols and/or the error correction data provided on said part(s)), by retrieving the correct aggregated hash value. Indeed, if a scan sub-block hash value cannot be calculated for a certain part of the support, it still can be obtained by reading and decoding the machine-readable representation of a sub-block hash value on said part of the support, and use the decoded hash value in the concatenation of all the hash values for determining a candidate aggregated hash value to be compared with the reference aggregated hash value.

A second sub-variant of the second variant of the verification method, wherein the human readable graphical symbols and the machine-readable error correction data on the support have been generated according to the second sub-variant of the second variant of the marking method, the reference aggregated hash value is stored in the ledger, the scanner is connected to a scanner communication unit operable to communicate via a communication link with the ledger, and the scanner is further operable to read and decode machine-readable representation of a sub-block verification path key on a corresponding part of the support and calculate an aggregated hash value from a pair of corresponding sub-block hash value and sub-block verification path key, comprises the further steps of:

calculating, with the hash function programmed in the scanner processing unit and in accordance with the operations carried out for calculating a sub-block hash value, a scan sub-block hash value of a selected corrected scanned graphical data sub-block, or a corresponding scanned error correction data sub-block, or any portion of a data sub-block resulting from a concatenation of the corrected scanned graphical data sub-block and the scanned error correction data sub-block;

scanning with the scanner a machine-readable representation of a sub-block verification path key, corresponding to the selected corrected scanned graphical data sub-block, on a corresponding part of the support, and extracting a corresponding scanned sub-block verification path key;

calculating a scan aggregated hash value with the calculated scan sub-block hash value and the scanned sub-block verification path key;

obtaining the reference aggregated hash value stored in the ledger via the scanner communication unit and the communication link, and checking whether the obtained reference aggregated hash value matches the scan aggregated hash value; and indicating a result of the checking operation via the scanner.

This second sub-variant of the second variant of the verification method allows checking the authenticity of each page of a document, independently, as a candidate root node hash value can be calculated from the data read on each page and compared with the reference aggregated hash value.

A third sub-variant of the second variant of the verification method, wherein the human readable graphical symbols and the machine-readable error correction data on the support have been generated according to the second sub-variant of the second variant of the marking method, the reference aggregated hash value available to the user is stored in the scanner memory, and the scanner is further operable to read and decode machine-readable representation of a sub-block verification path key on a corresponding part of the support and calculate an aggregated hash value from a pair of corresponding sub-block hash value and sub-block verification path key, comprises the further steps of:

calculating, with the hash function programmed in the scanner processing unit and in accordance with the operations carried out for calculating a sub-block hash value, a scan sub-block hash value of a selected corrected scanned graphical data sub-block, or a corresponding scanned error correction data sub-block, or any portion of a data sub-block resulting from a concatenation of the corrected scanned graphical data sub-block and the scanned error correction data sub-block;

scanning with the scanner a machine-readable representation of a sub-block verification path key, corresponding to the selected corrected scanned graphical data sub-block, on a corresponding part of the support, and extracting a corresponding scanned sub-block verification path key;

scanning on the support a reference aggregated hash value to obtain a scanned reference aggregated hash value;

calculating an aggregated scan hash value with the calculated scan sub-block hash value and the scanned sub-block verification path key;

checking whether the reference aggregated hash value stored in the scanner memory matches the aggregated scan hash value; and indicating a result of the checking operation via the scanner.

This third sub-variant of the second variant of the verification method allows an offline checking of the authenticity of each page of a document, independently, as a candidate root node hash value can be calculated from the data read on each page and compared with the reference aggregated hash value stored in the scanner memory.

The invention also relates to an alternative verifications method human readable graphical symbols provided together with machine-readable error correction data on a display of a computer, which have been generated according to the above mentioned method of generating verifiable graphical symbols on said display, wherein the computer has a scan application programmed on a processor operable to scan displayed human readable graphical symbols and machine-readable error correction data, comprising the steps of:

scanning the displayed human readable graphical symbols, via the scan application running on the computer processor, to obtain a scanned graphical data block being a digital representation of the scanned human readable graphical symbols;

scanning the displayed machine-readable error correction data and, via a machine-readable decoder of the scan application running on the computer processor, decoding the scanned machine-readable error correction data to obtain corresponding scanned error correction data in a scanned error correction data block;

correcting the scanned graphical data block with an error correction code of the scan application running on the computer processor, using the scanned error correction data of the scanned error correction data block, to obtain a corresponding corrected scanned graphical data block; and (a) displaying a visual representation of the corrected scanned graphical data block as corrected human readable graphical symbols on the display, or (b) displaying an indication specifying whether the scanned graphical data block contains an error, or (c) storing scan result data specifying whether the scanned graphical data block contains an error in a memory of the computer.

This alternative verification method (as a "displayed data verification method") is particularly adapted to support office software capabilities (e.g. like text processing applications) to detect frauds or errors in text documents (e.g. contracts, reports . . . ) displayed on a computer screen, that have been generated on the computer or have been downloaded in the computer (from an external memory like a USB key for example, or via a communication link with an external server like an email server for example). A specific application running on the computer in fact executes the operations performed by the scanner in the verification method.

The invention further relates to a support marked with human readable graphical symbols and machine-readable representation of associated error correction data according to the above mentioned marking method, or any one of its first and second variants, or any one of its first and second sub-variants of said second variant. Said support being further marked with:

a machine readable representation of a sub-block hash value according to the first sub-variant of the second variant of the marking method, or an associated machine-readable representation of a verification path key according to the second sub-variant of the second variant of the marking method.

According to another aspect, the invention relates to a scanner equipped with an imaging unit, a scanner processing unit and a scanner display, wherein the scanner processing unit is programmed to make the scanner operable to read verifiable graphical data marked on a support according to the invention by implementing the steps of the verification method, or its second variant and the third sub-variant of its second variant.

The scanner may further be equipped with a scanner communication unit operable to communicate via a communication link with a ledger, wherein the scanner processing unit is further programmed to make the scanner operable to acquire a hash value from the ledger by implementing the steps of the method according to any one of the first variant of the verification method or the first sub-variant or the second sub-variant of the second variant of the verification method.

Finally, the invention also relates to a computer program product operable, when running on a computer equipped with a processor, a memory and a display, to implement the steps of the alternative verification method (i.e. said "displayed data verification method") to verify human readable graphical symbols provided together with machine-readable error correction data on the display, which have been generated according to the marking method.

The present invention will be described more fully hereinafter with reference to the accompanying drawings in which like numerals represent like elements throughout the different figures, and in which prominent aspects and features of the invention are illustrated.

DETAILED DESCRIPTION

Figure 1:
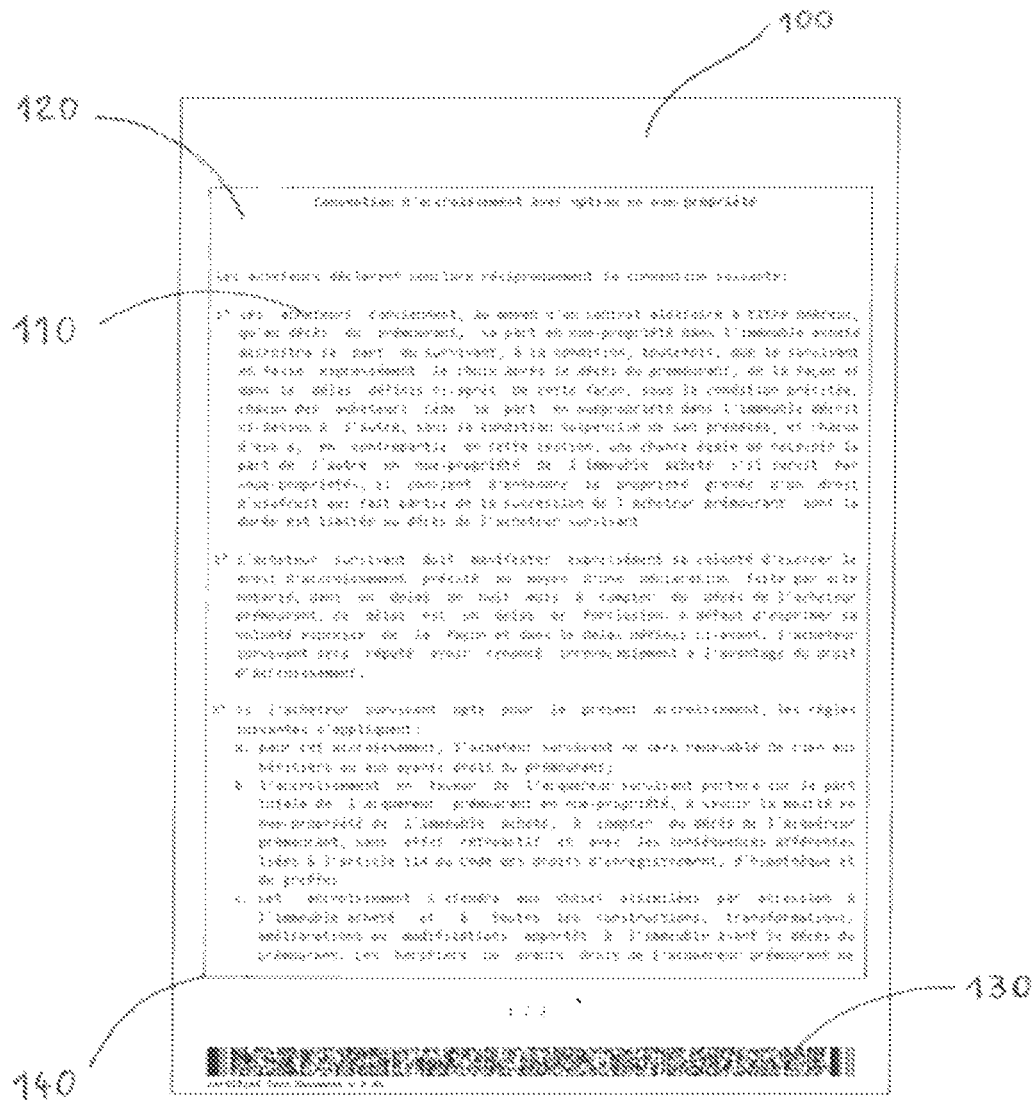
FIG. 1 illustrates an example of a support marked with verifiable graphical symbols according to the marking method of the invention.

FIG. 1 illustrates an example of a support 100 being a substrate (here a sheet of paper) marked with human readable representation of graphical symbols 110 (here letters of the alphabet, punctuation characters and numbers printed on the paper sheet 100) representing a piece of text of a contract printed in a text area 120 of the support 100, together with a machine-readable 2D barcode 130 (here a PDF417 barcode, i.e. "Portable Data File"417 barcode) printed below the text area 120. The piece of text in the text area 120 is a human readable representation of a corresponding graphical data block of graphical symbols.

A 2D barcode generally comprises the following parts:
a localization pattern (e.g. a "L" shape and a clock line for a Data Matrix, or three big squares for a QR-code);
some information areas about the code format;
a data zone to contain data; and
machine-readable error correction data to correct reading errors (e.g. Reed-Solomon error correction data).

An error correction code generally uses a correspondence table, i.e. a mapping between graphical symbols of a given finite set of reference graphical symbols (e.g. glyphs, like readable characters of an alphabet) and one-to-one corresponding codes (e.g. symbols coded on a given number of m bits).

The PDF417 barcode 130 is a well-known stacked linear barcode (ISO standard 15438) that can be read with a simple linear scan being swept over the barcode. In the embodiment of FIG. 1, the PDF417 barcode 130 is a machine-readable representation of an error correction data block which has been obtained by applying an error correction code (here, a conventional Reed-Solomon code) to the graphical data block of an arrangement of graphical symbols corresponding to the piece of text shown in the text area 120. The PDF417 barcode 130 also contains (as usual) data relating to a version of the (Reed-Solomon) code used to calculate the error correction data, data relating to the fonts, font size and line spacing of the text, the number of text rows and columns, the text area relative location with respect to markers 140 delimiting boundaries of the graphical data block (here, simple marks specifying the corners of the rectangular text area 120). Optionally, the barcode 130 may further contain signature data. This signature data may be, for example, a signature of a digital representation of the piece of text via a private encryption key (this signature can be decrypted via a corresponding public key).

Figure 2:
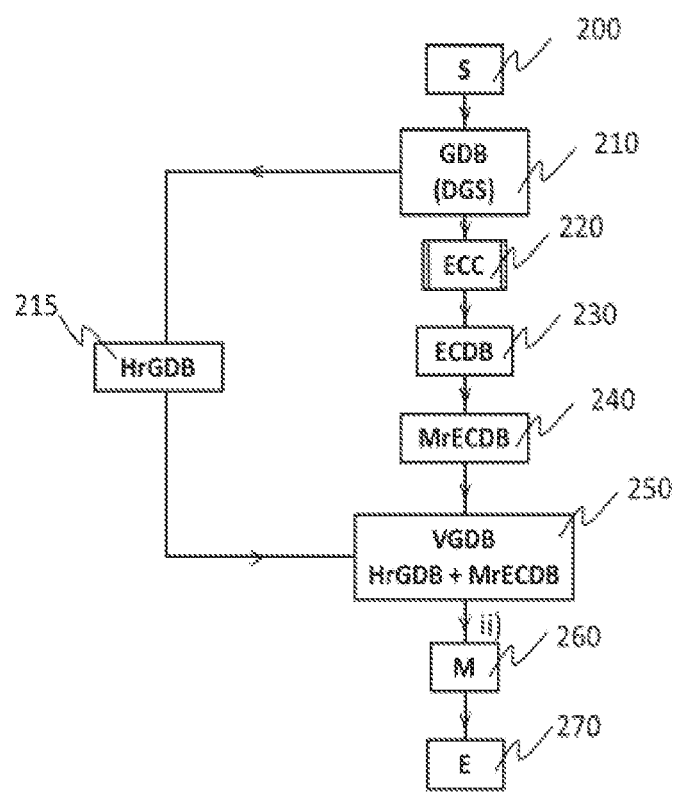
FIG. 2 is a flowchart illustrating the process of generating and marking verifiable graphical symbols on a substrate according to the marking method of the invention.

The piece of text printed in the text area 120 and the printed PDF417 barcode 130 respectively are examples of human readable graphical symbols HrGS and machine-readable representation of corresponding error correction data MrECD that have been obtained by the marking method illustrated on FIG. 2. Indeed, FIG. 2 shows a flowchart of the process of generating verifiable graphical data VGD on a substrate (here a sheet of paper) by means of a processing unit (CPU) that calculates a verifiable graphical data block VGDB, and marking a substrate via a marking device (e.g. an inkjet printer) having received said verifiable graphical data block VGDB. A graphical data block GDB 210 containing a digital representation of graphical symbols DGS is stored in a memory of the CPU, wherein each graphical symbol belongs to a given finite set of M (M≥1) graphical symbols {GS(1), . . . , GS(M)}. For example, the finite set of M=26 letters A to Z of the English alphabet. Each graphical symbol GS(i), i∈{1, . . . , M}, has its corresponding digital representation DGS(i), and the digital representation of graphical symbols DGS of the graphical data block GDB contains as many DGS(i) as there are graphical symbols in the piece of text (e.g. the piece of text in the text area 120). The generation process starts 200 by extracting 220 the digital representation of graphical symbols DGS from the stored graphical data bloc GDB, and processing with a programmed error correction code ECC the extracted digital representation of graphical symbols DGS to obtain corresponding error correction data ECD. These error correction data ECD are represented in an error correction data block ECDB 230. The obtained error correction data block ECDB is then formatted 240 to provide corresponding machine-readable error correction data MrECD represented in a machine-readable error correction data block MrECDB. The graphical data block GDB is also formatted to obtain 215 a corresponding human readable representation of its graphical symbols HrGS that are included in a human readable graphical representation data block HrGDB. A resulting verifiable graphical data block VGDB is obtained 250, which is composed of the two respective data blocks the human readable graphical representation data block HrGDB and the machine-readable error correction data block MrECDB. Symbolically: VGDB=HrGDB+MrECDB. The obtained verifiable graphical data block VGDB is then sent to a marking device, here a printer, and its content is marked 260 (i.e. printed) on the substrate 100 according to the formatting as corresponding verifiable graphical data VGD. The marked VGD contains corresponding human readable graphical symbols HrGS and machine-readable error correction data MrECD (symbolically: VGD=HrGS+ MrECD) which are respectively disposed on the paper sheet 100 according to the formatting (i.e. as separate blocks of data), which states the end 270 of the process of generating verifiable graphical data on the substrate 100 (see step (ii) of the above mentioned marking method).

Figure 3:
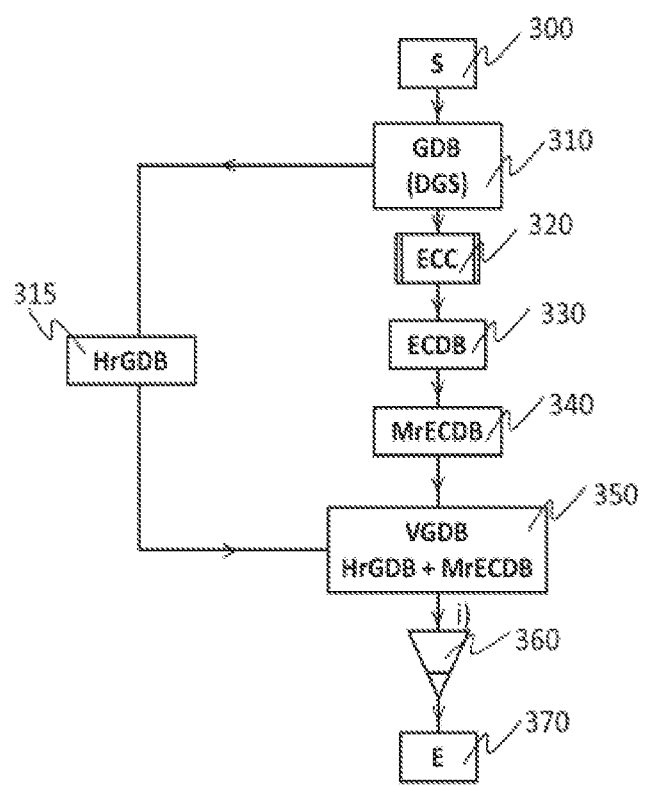
FIG. 3 is a flowchart of the process of generating and displaying verifiable graphical symbols on a display according to the marking method of the invention.

Instead of being marked on a substrate, the piece of text can be displayed, e.g. on a display of a tablet or a computer, as illustrated on the flowchart of FIG. 3. As in previous FIG. 2, a graphical data block GDB 310 containing a digital representation of graphical symbols DGS is stored in a memory of the CPU (each graphical symbol belonging to the given finite set of M≥1 graphical symbols {GS(1), . . . , GS(M)}). The graphical data block GDB contains as many digital representations DGS(i) as there are graphical symbols GS(i) in the displayed piece of text. The generation process starts 300 by extracting 320 the digital representation of graphical symbols DGS from the stored graphical data bloc GDB, and processing with a programmed error correction code ECC the extracted DGS to obtain corresponding error correction data ECD. These error correction data ECD are included in an error correction data block ECDB 330 which is then formatted 340 to provide corresponding machine-readable error correction data MrECD included in a machine-readable error correction data block MrECDB. The graphical data block GDB is also formatted to obtain 315 a corresponding human readable representation of its graphical symbols HrGS that is included in a human readable graphical representation data block HrGDB. A resulting verifiable graphical data block VGDB is obtained 350, composed of the two respective data blocks HrGDB and MrECDB (symbolically, VGDB=HrGDB+ MrECDB). The verifiable graphical data block VGDB is then displayed 360 on the display according to the formatting as separate human readable representation of graphical symbols HrGS and machine-readable representation of error correction data MrECD, which states the end 370 of the process of generating verifiable graphical symbols on a support (see step (i) of the above mentioned marking method).

According to the invention, several variants and sub-variants of the marking method increase the level of confidence in the conformity between the human readable graphical symbols as directly read on the support by a user and the human readable version that can be extracted from the machine-readable representation of the error correction data (read by a dedicated device). These variants correspond to the above mentioned first and second variants.

The first variant of the marking method uses the quasi non-invertibility of the one-way functions, like the hash functions for example. In this first variant, after having carried out the steps of the above marking method, a hash function H, programmed on the processing unit, is further used to obtain a hash of the digital representation of the graphical symbols or the error correction data (or some parts of these data), by calculating a hash value of the graphical data block GDB, or the error correction data block ECDB, or any portion of a concatenation (GDB⊕ECDB) of the graphical data block GDB and the error correction data block ECDB. The hash value (e.g. with a hash function SHA-256) may be calculated on the mere graphical data block: H(GDB). Preferably, the hash value is calculated on the full concatenation block: H(GDB⊕ECDB). In case the hash value is calculated on only a portion of the concatenation of the graphical data block GDB and the error correction data block ECDB, it is clear that a bit length of that portion must sufficient for providing a good security level, say must at least be equal to 100 bits and preferably have the bit length of the result delivered by the selected hash function: e.g. with a SHA-256 hash, the bit length of the portion is at least of 256 bits (then, in practice, the hash is non-invertible). Thus, any change, even of a single bit, in the argument of the hash function (i.e. any change in the graphical symbols or machine readable data on the support) will generate a different value of the hash.

In said first variant of the marking method, the hash value is further stored in a ledger, preferably a blockchain (the stored value being then practically immutable), as a reference hash value $H_{ref}$. Optionally, the reference hash value $H_{ref}$ may be further signed with an encryption key, preferably a private key $Pr_k$, (stored in a memory of the processing unit) to obtain a corresponding signed reference hash value $S(H_{ref})$ and the signed reference hash value $S(H_{ref})$ is stored (e.g. in a ledger like a database or a blockchain) or provided on the support, this latter option being compatible with an off-line verification process provided that a public key $Pu_k$ corresponding to the private key $Pr_k$ is used for checking the signature (i.e. verifying that the signed reference hash value has been signed with the right private key, or even for retrieving $H_{ref}$ by decrypting $S(H_{ref})$ with the public decryption key as with the RSA "Rivest-Shamir-Adleman" algorithm).

Figure 4:
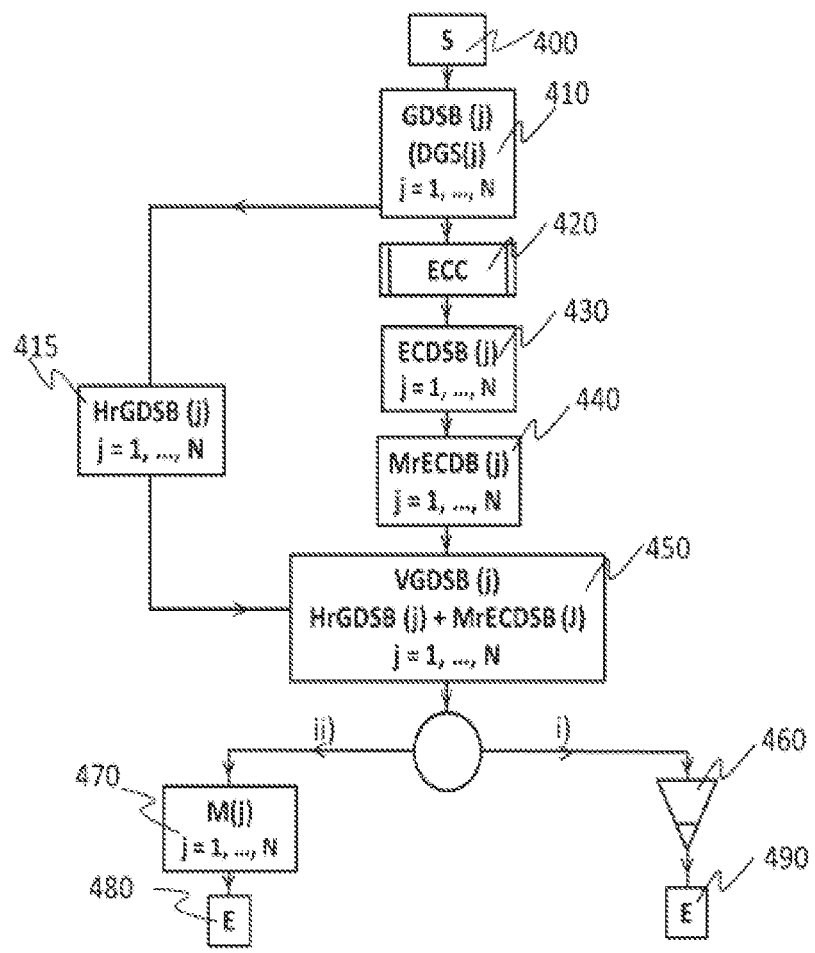
FIG. 4 is a flowchart illustrating the process of generating and providing verifiable graphical symbols on a support according to a second variant of the marking method of the invention.

The second variant of the marking method, illustrated by an embodiment shown on FIG. 4, is well suited for providing graphical symbols on a plurality of parts of the support, like, for example, printing (as with option (ii) of the marking method) a text document comprising a plurality of pages (e.g. the N pages of a report or a contract etc.), or displaying (as with option (i) of the marking method) a digital version of a text document of N pages on a screen in a given format (e.g. in Microsoft Word or pdf format), page by page, wherein each one of the N (N≥2) pages marked on the substrate, or each one of the N displayed pages, shows a specific piece of human readable graphical symbols HrGS(j) (j∈{1, . . . , N}) and a machine-readable representation of corresponding error correction data MrECD(j): both being representations obtained from a piece of verifiable graphical data VGD(j) of a corresponding specific verifiable graphical data sub-block VGDSB(j). In these cases, according to said second variant of the marking method, the method starts 400 and the (full) graphical data block GDB is split 410 by the processing unit into N sub-blocks GDSB(1), . . . , GDSB(N) (i.e. one sub-block for each part of the support), wherein each graphical data sub-block GDSB(j) is formatted to provide 415 a corresponding human readable representation HrGS(j) of its graphical symbols GS(j) in a corresponding human readable graphical data sub-block HrGDSB(j). For each graphical data sub-block GDSB(j) (j=1, . . . , N), the processing unit generates corresponding sub-block error correction data by correcting 420 the graphical data sub-block GDSB (j) with the programmed error correction code ECC, and then forms 430 with the corrected data an error correction data sub-block ECDSB(j). The processing unit generates 440 a machine-readable representation of each error correction data sub-block ECDSB(j) as a corresponding machine-readable error correction data sub-block MrECDSB(j). The processing unit then formats each sub-blocks HrGDSB(j) and MrECDSB(j), so that a representation of the latter on the support is distinct from the human readable representation HrGS(j) of the graphical symbols GS(j) of the former, to provide 450 corresponding verifiable graphical data sub-block symbolically written VGDSB(j)=HrGDSB(j)+MrECDSB(j). Depending on the selected option (i) or (ii) of the marking method, data of the sub-blocks VGDSB(j), j=1, . . . , N, are displayed 460 on a display or are marked 470 on a substrate (e.g. are printed on a paper sheet as on FIG. 1) according to the format as verifiable graphical data VGD(j) (symbolically: VGD(j)=HrGS(j)+MrECD(j)), each marking M(j) of VGD (j) being provided on a part j of the substrate (e.g. printed on the j-th page of the document of N pages), which states the end 480-490 of the process of generating verifiable graphical data on the support.

Several sub-variants of the above second variant of marking method increase the level of confidence in the authenticity of the human readable graphical symbols or the machine-readable representation of the error correction data provided on the support. These sub-variants in fact are the first and second sub-variants. These sub-variants also use the quasi non-invertibility of the one-way functions (e.g. the hash functions like the SHA-256 hash functions). In these two sub-variants, after having carried out the steps of the above second variant of the marking method, a hash function H, programmed on the processing unit, is further used to obtain a hash of the digital representation of the graphical symbols or the error correction data (or some parts of these data). Due to the fact that in said second variant of the marking method the graphical data block GDB and corresponding error correction data block ECDB are split into N sub-blocks (corresponding to the N parts of the support), there are several possibilities to define for each sub-block j (j=1, . . . , N) a corresponding sub-block hash value H(j) as explained above: one of these possibilities must be selected, and will serve for calculating the N sub-block hash values in any one of these sub-variants (and also in the variants of the verification method).

In a first sub-variant of the second variant of the marking method, the processor unit calculates for each graphical data sub-block GDSB(j) (j=1, . . . , N) a sub-block hash value H(j): for example, in a preferred embodiment, the full concatenation of the graphical data sub-block GDSB(j) and the error correction data sub-block ECDSB(j) is selected for the sub-block hash value, i.e. H(j)=H(GDSB(j)⊕ECDSB (j)). In general, the sub-block hash values H(j), j=1, . . . , N, are defined according to one of the following possibilities: we may have H(j)=H(GDSB(j)), or H(j)=H(ECDSB(j)), or by taking a hash of any portion of a concatenation (GDSB (j)⊕ECDSB(j)) of the graphical data sub-block GDSB(j) and the error correction data sub-block ECDSB (j), i.e. with H(j)=H(portion of (GDSB(j)⊕ECDSB(j)) (with the constraint regarding the bit length of the portion already mentioned).

Then, a machine-readable representation MrH(j) of each sub-block hash value H(j) is calculated by the processing unit and associated with the corresponding verifiable graphical data sub-block VGDSB(j) (j=1, . . . , N). As a result, in addition to the human readable representation of the j-th sub-block graphical symbols HrGS(j) and the machine-readable representation of the j-th sub-block error correction data MrECD(j) (from the verifiable graphical data sub-block VGDSB(j)), the j-th page of the document further comprises the machine-readable representation MrH(j) of the j-th sub-block hash value. This sub-variant allows to further secure the sub-block graphical data and the corresponding sub-block error correction data via the one-way hash function as any modification of said j-th sub-block data will not allow to retrieve the data content of MrH(j). Moreover, this further advantage is obtained with only a limited additional data provided on the support in the form of a mere machine-readable representation of a sub-block hash value. In said first sub-variant of the second variant of the marking method, the N sub-block hash values H(j) (j=1, . . . , N) are then used to calculate a reference aggregated hash value $H_{ref}$. As mentioned above, the N sub-block hash values H(j), j=1, . . . , N, may be calculated on the mere graphical data sub-blocks, i.e. H(j)=H(GDSB(j)). Preferably, the sub-block hash values are calculated on the full concatenation of sub-blocks: H(j)=H(GDSB(j)⊕ECDSB(j)). Thus, any change, even of a single bit, in the argument of any one the sub-block hash functions H(j) (i.e. any change in the sub-block graphical or sub-block machine readable data on the support) will generate a different value of the aggregated hash value $H_{ref}$. In this first sub-variant, the processing unit concatenates all the N sub-block hash values H(j), j=1, . . . , N, to obtain the reference aggregated hash value $H_{ref}$=H(1)⊕H(2)⊕ . . . H(N−1)⊕H(N) (the symbol ⊕ indicating an operation of concatenation). This reference hash value $H_{ref}$ is further stored in a ledger (i.e. in a server or database, preferably in a blockchain).

Optionally, the memory of the processing unit may further store a key for encrypting digital data, preferably a private key $Pr_k$ paired with a public key $Pu_k$ (i.e. for asymmetric-key encryption), the processing unit, after having concatenated all the N sub-block hash values to obtain the reference aggregated hash value $H_{ref}$=H(1)⊕H(2)⊕ . . . ⊕H(N−1)⊕H (N), may further sign (i.e. encrypt) the reference aggregated hash value $H_{ref}$ with the encryption key (preferably the private key $Pr_k$) to obtain a reference aggregated hash value signature $S(H_{ref})$. This signature may then be stored (e.g. in the memory of the processing unit, or in a database, or in a blockchain), or further provided on the support. This latter option allowing an off-line verification process provided that a corresponding key, preferably the public key $Pu_k$ associated with the private key $Pr_k$, is used for checking that the signature is genuine (i.e. has been obtained with the right private key $Pr_k$).

Figure 5:
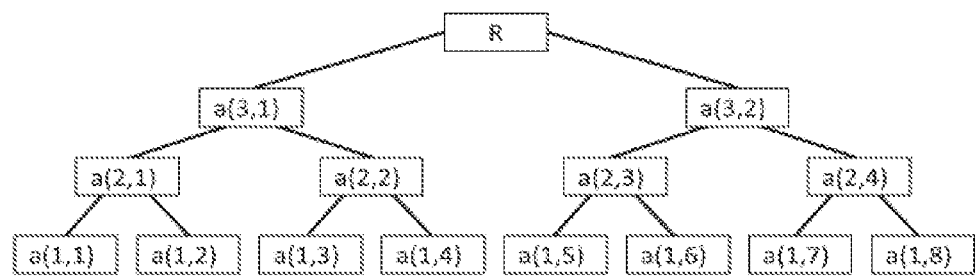
FIG. 5 shows an example of hash tree used in the second sub-variant of the second variant of the marking method according to the invention.

In the second sub-variant of the second variant of the marking method, after having calculated the N sub-block hash values H(j), j=1, . . . , N (in the same way as in the above first sub-variant), the reference aggregated hash value $H_{ref}$ is calculated by the processing unit as the root node value R of a tree, preferably a binary tree. This tree has the N sub-block hash values H(1), H(2), . . . , H(N−1), H(N) as leaf nodes, as illustrated on FIG. 5 (with an example of a mere binary tree with N=8). Here too, the hash values are representative of values generally obtained via a one-way function (e.g. a hash function H( ) of the SHA-256 family). The tree is thus generally based on the plurality of calculated sub-block hash values H(j), j=1, . . . , N, and comprises nodes arranged according to a given nodes ordering in the tree. The tree comprises node levels from the leaf nodes a(1,j), j=1, . . . , N, respectively corresponding to the plurality of sub-block hash values H(1), H(2), . . . , H(N−1), H(N), and non-leaf nodes up to the root node R of the tree, every non-leaf node (i.e. node comprised between a leaf node and the root node) of the tree corresponding to a hash value of a concatenation of the respective hash values of its child nodes according to a tree concatenation ordering, the root node R corresponding to the reference aggregated hash value $H_{ref}$, i.e. a hash value of a concatenation of the hash values of the nodes of a penultimate nodes level in the tree according to said tree concatenation ordering. In the example of FIG. 5, with N=8, we thus have eight leaf nodes (first level of the tree) a(1,j)=H(j), j=1, . . . , 8, and for the four node values of the second level: a(2,1)=H(a(1,1)⊕a(1, 2)); a(2,2)=H(a(1,3)⊕a(1,4)); a(2,3)=H(a(1,5)⊕a(1,6)); a(2,4)=H(a(1,7)⊕a(1,8)). For the two node values of the third (penultimate) level: a(3,1)=H(a(2,1)⊕a(2,2)) and a(3,2)=H(a(2,3)⊕a(2,4)). The root node value R is thus: R=H(a(3,1)⊕a(3,2))≡$H_{ref}$.

We remark that it is possible to choose a different tree concatenation ordering for each non-leaf node: for example, instead of having a(2,4)=H(a(1,7)⊕a(1,8)) we could define a(2,4)=H(a(1,8)⊕a(1,7)), which gives a different node value. The processing unit then calculates for each sub-block hash value H(j) (i.e. for each leaf node of the tree a(1,j)), j=1, . . . , N, an associated sub-block verification path key VPK(j). The sub-block verification path key VPK(j) relating to the leaf node a(1,j) (and thus to the sub-block hash value H(j)) is a series of hash values of selected non-leaf nodes of the tree which are necessary to retrieve the root node value R starting from the leaf node a(1,j). The selected non-leaf nodes in fact correspond to a certain path in the tree between the leaf node a(1,j) and the root node R. A sub-block verification path key associated with a given leaf node of the tree in fact is a sequence of the respective node values, from the leaf nodes level to the penultimate nodes level, of every other leaf node having the same parent node in the tree that the given leaf-node, and successively at each next level in the tree, of every non-leaf node having the same parent node in the tree that the previous same parent node considered at the preceding level. In the example of the mere binary tree with eight leaf nodes a(1,1), . . . , a(1,8) shown on FIG. 5, the eight sub-block verification path keys VPK(1), . . . , VPK(8) are determined as follows (according to the above definition):

1) for given leaf node a(1,1)=H(1), the associated sub-block verification path key is VPK(1)={a(1,2),a(2,2),a(3,2)}, from which the root digital signature value R can be retrieved via the following steps (executed according to the nodes ordering in the tree and the tree concatenation ordering):
    i) from given leaf node a(1,1)=H(1) and leaf node a(1,2)=H(2) in VPK(1) (a(1,2) is the "other leaf node having the same parent node", i.e. node a(2,1), "that the given leaf node", i.e. node a(1,1)), the parent node value a(2,1) is obtained by a(2,1)=H(a(1,1)⊕a(1,2)) (i.e. a(2,1)=H(H(1)⊕H(2))),
    ii) from the obtained a(2,1) and the next node value in VPK(1), i.e. a(2,2) of next non-leaf nodes level, which is a non-leaf node having the same parent node in the tree, i.e. node a(3,1), that the previous same parent node considered at the preceding level, i.e. node a(2,1), the parent node value a(3,1) is obtained by a(3,1)=H(a(2,1)⊕a(2,2)),
    iii) from the obtained a(3,1) and the next node value in VPK(1), i.e. a(3,2) of the penultimate nodes level, which is a non-leaf node having the same parent node in the tree, i.e. the root node R, that the previous same parent node considered at the preceding level, i.e. node a(3,1), the root node value R is obtained by R=H(a(3,1)⊕a(3,2)).

Remark: in this example we have three steps i), ii) and iii), because the tree has three levels below the root node level and thus, the sub-block verification path key contains three node values.

Thus, based on VPK(1)={a(1,2),a(2,2),a(3,2)} associated with a(1,1), the value of the root node of the tree can be obtained as: R=H(H(H(a(1,1)⊕a(1,2))⊕a(2,2))⊕a(3,2)).

2) for a given leaf node a(1,2)=H(2), the associated sub-block verification path key is VPK(2)={a(1,1),a(2,2),a(3,2)}, from which the root value R can be retrieved via the following steps (executed according to the nodes ordering in the tree and the tree concatenation ordering):
    i) from given a(1,2)=H(2) and a(1,1)=H(1) in VPK(2) (a(1,1) is the other leaf node having the same parent node, i.e. node a(2,1), that the given leaf node, i.e. node a(1,2)), the parent node value a(2,1) is obtained by a(2,1)=H(a(1,1)⊕a(1,2)),
    ii) from the obtained a(2,1) and the next node value in VPK(2), i.e. a(2,2) of next non-leaf nodes level, which is a non-leaf node having the same parent node in the tree, i.e. node a(3,1), that the previous same parent node considered at the preceding level, i.e. node a(2,1), the parent node value a(3,1) is obtained by a(3,1)=H(a(2,1)⊕a(2,2)),
    iii) from the obtained a(3,1) and the next node value in VPK(2), i.e. a(3,2) of the penultimate nodes level, which is a non-leaf node having the same parent node in the tree, i.e. the root node, that the previous same parent node considered at the preceding level, i.e. node a(3,1), the root node value R is obtained by R=H(a(3,1)⊕a(3,2)).

Thus, based on VPK(2)={a(1,1),a(2,2),a(3,2)} associated with a(1,2), the value of the root node of the tree can be obtained as: R=H(H(H(a(1,1)⊕a(1,2))⊕a(2,2))⊕a(3,2)).

3) for a given leaf node a(1,3)=H(3), the sub-block verification path key is VPK(3)={a(1,4),a(2,1),a(3,2)}, from which the root value R can be retrieved via the following steps (executed according to the nodes ordering in the tree and the tree concatenation ordering):
    i) from a(1,3)=H(3) and a(1,4)=H(4) in VPK(3) (a(1,4) is the other leaf node having the same parent node, i.e. node a(2,2), that the given leaf node, i.e. node a(1,3)), the parent node value a(2,2) is obtained by a(2,2)=H(a(1,3)⊕a(1,4)),
    ii) from the obtained a(2,2) and the next node value in VPK(3), i.e. a(2,1) of next non-leaf nodes level, which is a non-leaf node having the same parent node in the tree, i.e. node a(3,1), that the previous same parent node considered at the preceding level, i.e. node a(2,2), the parent node value a(3,1) is obtained by a(3,1)=H(a(2,1)⊕a(2,2)),
    iii) from the obtained a(3,1) and the next node value in VPK(3), i.e. a(3,2) of the penultimate nodes level, which is a non-leaf node having the same parent node in the tree, i.e. the root node, that the previous same parent node considered at the preceding level, i.e. node a(3,1), the root node value R is obtained by R=H(a(3,1)⊕a(3,2)).

Thus, the value of the root node of the tree can be obtained as: R=H(H(a(2,1)⊕H(a(1,3)⊕a(1,4)))⊕a(3,2)).

4) for a given leaf node a(1,4)=H(4), the sub-block verification path key is VPK(4)={a(1,3),a(2,1),a(3,2)}, from which the root value R can be retrieved via the following steps (executed according to the nodes ordering in the tree and the tree concatenation ordering):
    i) from a(1,4)=H(4) and a(1,3)=H(3) in VPK(4), the parent node value a(2,2) is obtained by a(2,2)=H(a(1,3)⊕a(1,4)),
    ii) from the obtained a(2,2) and the next node value in VPK(4), i.e. a(2,1) of next non-leaf nodes level, the parent node value a(3,1) is obtained by a(3,1)=H(a(2,1)⊕a(2,2)),
    iii) from the obtained a(3,1) and the next node value in VPK(4), i.e. a(3,2) of the penultimate nodes level, the root node value R is obtained by R=H(a(3,1)⊕a(3,2)).

Thus, the value of the root node of the tree can be obtained as: $R=H(H(a(2,1)\oplus H(a(1,3)\oplus a(1,4)))\oplus a(3,2))$.

5) for a given node $a(1,5)=H(5)$, the sub-block verification path key is $VPK(5)=\{a(1,6),a(2,4),a(3,1)\}$, from which the root value R can be retrieved via the following steps (executed according to the nodes ordering in the tree and the tree concatenation ordering):
   i) from $a(1,5)=H(5)$ and $a(1,6)=H(6)$ in VPK(5), the parent node value $a(2,3)$ is obtained by $a(2,3)=H(a(1,5)\oplus a(1,6))$,
   ii) from the obtained $a(2,3)$ and the next node value in VPK(5), i.e. $a(2,4)$ of next non-leaf nodes level, the parent node value $a(3,2)$ is obtained by $a(3,2)=H(a(2,3)\oplus a(2,4))$,
   iii) from the obtained $a(3,2)$ and the next node value in VPK(5), i.e. $a(3,1)$ of the penultimate nodes level, the root node value R is obtained by $R=H(a(3,1)\oplus a(3,2))$.

Thus, the value of the root node of the tree can be obtained as: $R=H(a(3,1)\oplus H(H(a(1,5)\oplus a(1,6))\oplus a(2,4)))$.

6) for a given node $a(1,6)=H(6)$, the sub-block verification path key is $VPK(6)=\{a(1,5),a(2,4),a(3,1)\}$, from which the root value R can be retrieved via the following steps (executed according to the nodes ordering in the tree and the tree concatenation ordering):
   i) from $a(1,6)=H(6)$ and $a(1,5)=H(5)$ in VPK(6), the parent node value $a(2,3)$ is obtained by $a(2,3)=H(a(1,5)\oplus a(1,6))$,
   ii) from the obtained $a(2,3)$ and the next node value in VPK(6), i.e. $a(2,4)$ of next non-leaf nodes level, the parent node value $a(3,2)$ is obtained by $a(3,2)=H(a(2,3)\oplus a(2,4))$,
   iii) from the obtained $a(3,2)$ and the next node value in VPK(6), i.e. $a(3,1)$ of the penultimate nodes level, the root node value R is obtained by $R=H(a(3,1)\oplus a(3,2))$.

Thus, the value of the root node of the tree can be obtained as: $R=H(a(3,1)\oplus H(H(a(1,5)\oplus a(1,6))\oplus a(2,4)))$.

7) for a given node $a(1,7)=H(7)$, the sub-block verification path key is $VPK(7)=\{a(1,8),a(2,3),a(3,1)\}$, from which the root value R can be retrieved via the following steps (executed according to the nodes ordering in the tree and the tree concatenation ordering):
   i) from $a(1,7)=H(7)$ and $a(1,8)=H(8)$ in VPK(7), the parent node value $a(2,4)$ is obtained by $a(2,4)=H(a(1,7)\oplus a(1,8))$,
   ii) from the obtained $a(2,4)$ and the next node value in VPK(7), i.e. $a(2,3)$ of next non-leaf nodes level, the parent node value $a(3,2)$ is obtained by $a(3,2)=H(a(2,3)\oplus a(2,4))$,
   iii) from the obtained $a(3,2)$ and the next node value in VPK(7), i.e. $a(3,1)$ of the penultimate nodes level, the root node value R is obtained by $R=H(a(3,1)\oplus a(3,2))$.

Thus, the value of the root node of the tree can be obtained as: $R=H(a(3,1)\oplus H(a(2,3)\oplus H(a(1,7)\oplus a(1,8))))$.

8) for a given node $a(1,8)=H(8)$, the sub-block verification path key is $VPK(8)=\{a(1,7),a(2,3),a(3,1)\}$, from which the root value R can be retrieved via the following steps (executed according to the nodes ordering in the tree and the tree concatenation ordering):
   i) from $a(1,8)=H(8)$ and $a(1,7)=H(7)$ in VPK(8), the parent node value $a(2,4)$ is obtained by $a(2,4)=H(a(1,7)\oplus a(1,8))$,
   ii) from the obtained $a(2,4)$ and the next node value in VPK(8), i.e. $a(2,3)$ of next non-leaf nodes level, the parent node value $a(3,2)$ is obtained by $a(3,2)=H(a(2,3)\oplus a(2,4))$,
   iii) from the obtained $a(3,2)$ and the next node value in VPK(8), i.e. $a(3,1)$ of the penultimate nodes level, the root node value R is obtained by $R=H(a(3,1)\oplus a(3,2))$.

Thus, the value of the root node of the tree can be obtained as: $R=H(a(3,1)\oplus H(a(2,3)\oplus H(a(1,7)\oplus a(1,8))))$.

Generally, for retrieving a (candidate) root node value by starting from a given leaf node value and the node values specified in the verification path key associated with said given leaf node, the following steps are performed:
  extracting from the sequence of node values in the sub-block verification path key, a node value of every other leaf node of the tree having the same parent node than that of the given leaf node and calculating a hash value of a concatenation of the given node value and, respectively according to the ordering of nodes in the tree and the tree concatenation ordering, the extracted node value of said every other leaf node, thus obtaining a hash value of said same parent node of the given leaf node;
  successively at each next level in the tree and up to the penultimate nodes level:
    extracting from the sequence of node values in the sub-block verification path key, a node value of every other non-leaf node of the tree having the same parent node than that of the previous same parent node considered at the preceding step, and
    calculating a hash value of a concatenation of the node value of said respective every other non-leaf node and the obtained hash value of said previous same parent node, according to the ordering of nodes in the tree and the tree concatenation ordering, thus obtaining a node value of said same parent node of said previous same parent node; and
  calculating a hash value of a concatenation of the obtained node values of the non-leaf nodes corresponding to the penultimate nodes level of the tree according to the ordering of nodes in the tree and the tree concatenation ordering, thus obtaining a root node value of the tree.

In a next step of the second sub-variant of the second variant of the marking method, the processing unit generates a machine-readable representation MrVPK(j) of each sub-block verification path key VPK(j) (j=1, . . . , N), and includes it, associated with the respectively corresponding human readable graphical data sub-block HrGDSB(j) and machine-readable error correction data sub-block MrECDSB(j), in the verifiable graphical data sub-block VGDSB(j). The verifiable graphical data sub-block VGDSB (j) is then further formatted to provide a machine-readable representation of said sub-block verification path key that is separate from the human readable representation of the associated graphical data sub-block GDSB(j) and the machine-readable representation of the associated error correction data sub-block ECDSB(j), and then provided on the support (as component of the corresponding sub-block verifiable graphical data). Thus, the verifiable graphical data sub-block is now symbolically written: VGDSB(j)=HrGDSB(j)+MrECDSB(j)+MrVPK(j), j=1, . . . , N. Finally, one of the following steps is further performed:
   (iii) the reference aggregated hash value $H_{ref}=R$ is stored in a ledger (preferably in a blockchain), or (iv) the reference aggregated hash value $H_{ref}$=R is made available to a user.

Optionally, $H_{ref}$ may be signed with a signature private key $Pr_k$ (stored in a memory of the processing unit), via the processing unit, to obtain a reference aggregated hash value signature $S(H_{ref})$, and the reference aggregated hash value signature $S(H_{ref})$ is stored (e.g. in the ledger) or further provided on the support or made available to a user. Then, by using a corresponding public key $Pu_k$, it is possible to check whether $S(H_{ref})$ is genuine.

As a result, for each graphical data sub-block GDSB(j) (j=1, . . . , N) of the graphical data block GDB, there are provided on the support corresponding sub-block human readable graphical symbols together with corresponding sub-block machine-readable error correction data that are authenticatable by a user by retrieving the root value R via the sub-block hash value H(j) and its corresponding verification path key VPK(j) that can be obtained from data read on the support, respectively from the sub-block human readable graphical symbols HrGS(j) and the machine-readable representation of the sub-block verification path key MrVPK(j).

As it is clear from the above example, the root node value R can finally be retrieved from any given leaf node value by calculating a hash value of a concatenation of this given leaf node value with only the node values specified in the corresponding sub-block verification path key. Thus, the volume of data in the verification information based on a verification path key (to be read on the support) that is necessary for retrieving the root node value R is clearly much lower than the volume of data necessary for calculating the reference root node value $H_{ref}$ based only on all the leaf node values (i.e. by calculating all the non-leaf node values of the intermediate levels of the tree): this is an advantage of the invention in view of the constraint of limited size available on a machine readable representation of data (like, e.g., a two-dimensional barcode).

Thus, according to the invention, the entanglement of the hash values of all the original sub-block hash values, due to the tree structure and use of robust one-way functions for calculating the node values of the tree (like the SHA-256 hash functions in the above embodiment), together with the root node value R of the tree (that can be made immutable if stored in a blockchain) and the inclusion of machine-readable error correction data and associated machine-readable verification path key on the support together with corresponding human readable representation of graphical data, allow to prevent falsification of data on the marked support with a very high level of reliability.

The above embodiments of the marking method provide on a support (paper sheet 100 or display) human readable graphical symbols together with corresponding machine-readable error correction data that can be easily verified by a user. Indeed, according to the verification method of the invention of which an illustrative flowchart is shown on FIG. 6, a user having a scanner equipped with an imaging unit, a scanner processing unit with a scanner memory, and a scanner display, can check whether the human readable graphical symbols HrGS on the support have been modified or not with respect to the original ones, or may even retrieve the original graphical symbols. In the following illustrative embodiment of the verification method, the human readable graphical symbols HrGS constitute a text provided on the support according to the marking method. For example, the text may be printed on a substrate (e.g. a paper sheet, as on FIG. 1) or electronically displayed on a screen. The imaging unit of the scanner is operable to image the text and the corresponding machine-readable representation of error correction data MrECD on the support. The scanner processing unit is programmed to perform image processing of an image of the support taken by the imaging unit to extract text data and obtain a digital representation of the extracted text data as a corresponding scanned graphical data block SGDB. The scanner processing unit is also programmed to perform image processing of an image of the machine-readable representation of error correction data MrECD on the support taken by the imaging unit to extract corresponding scanned error correction data SECD, by further using a programmed (on the scanner processing unit) machine-readable decoder, and obtain a digital representation of the scanned error correction data SECD as a corresponding scanned error correction data block SECDB. The scanner processing unit is further programmed to perform the operations of error correction of data blocks by using an error correction code ECC. The scanner may be, for example, a mere smartphone with a camera (as imaging unit) and having image processing, decoding, and error correction applications operable to run on its processing unit.

Figure 6:
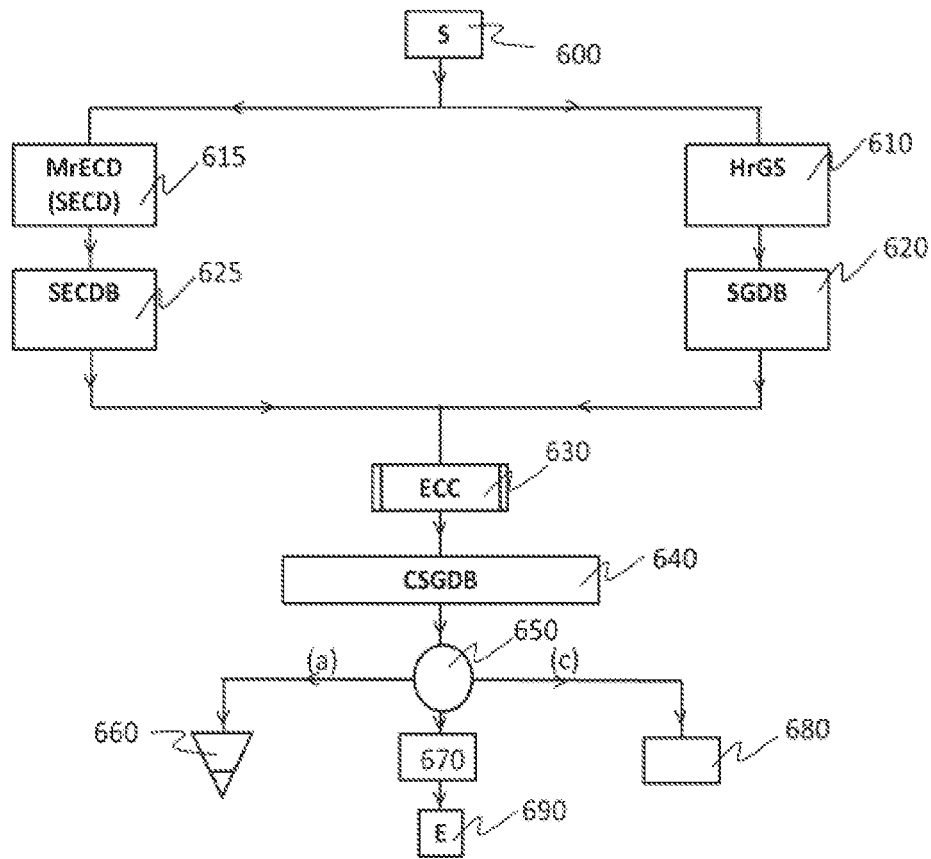
FIG. 6 is a flowchart illustrating the process of verifying graphical symbols and machine-readable data provided on a support according to the verification method of the invention.

The general verification process shown on FIG. 6, with the example of marked support of FIG. 1, starts 600 by:

scanning (via the scanner imaging unit) with the scanner the text HrGS 610 on the support, i.e. text 110 on text area 120 of the paper sheet 100, and obtaining a corresponding scanned graphical data block SGDB 620 (i.e. a digital representation of the scanned text); and scanning the machine-readable representation of error correction data MrECD 615 on the support with the scanner, i.e. the PDF417 barcode 130 on the paper sheet 100, decoding the machine-readable representation of error correction data MrECD (with the programmed machine-readable decoder) to extract corresponding scanned error correction data SECD, and forming a corresponding scanned error correction data block SECDB 625 (i.e. a digital representation of the extracted SECD); and correcting 630 the scanned graphical data block SGDB, via the error correction code ECC programmed on the scanner processing unit (using the extracted SECD of the SECDB), and obtaining a corrected scanned graphical data block CSGDB 640, the corrected scanned graphical data block CSGDB containing a digital representation of corresponding corrected human readable graphical symbols CHrGS; and at step 650, performing at least one of the three options:
(a) displaying 660 on the scanner display the corrected scanned graphical data block CSGDB as corresponding corrected human readable graphical symbols CHrGS; or
(b) indicating 670 via the scanner (e.g. on the scanner display, or with any visual or sound alarm delivered by the scanner) whether the scanned graphical data block SGDB contains an error (based on a result of the correction 630); or
(c) storing 680 scan result data specifying whether the scanned graphical data block SGDB contains an error (based on a result of the correction 630) in the scanner memory.

Delivering a result of the selected option(s) (a), (b) and (c) puts an end 690 to the verification process.

Option (a) allows the user to visually compare the version of the text CHrGS displayed on the scanner display, that has been corrected via the programmed error correction code ECC using the scanned error correction data SECD (obtained from the machine-readable representation of error correction data MrECD), and the (non-corrected) text HrGS as scanned on the support. Preferably, the difference(s) of the displayed text with the text as scanned may be highlighted to help the user to easily detect and locate any change in the text (e.g. due to alteration or fraud).

With option (b), the user can be alerted in case of any difference between the corrected text CHrGS and the text HrGS as scanned on the support.

Option (c) allows keeping a trace of any existing difference between the corrected text and the text as scanned on the support. Alternatively, in case the scanner is further equipped with communication means (e.g. a smartphone) and can be connected to an external server, the scan result data can be stored in a server memory via a communication link.

An advantage of the above verification method is that it allows off-line check (i.e. without connection to an external device through a communication link) of conformity between the text provided on the support, as human readable graphical symbols, and the human readable version that can be obtained from a machine-readable representation of error correction data read on the support: because said version results from a correction via an error correction code (similar to that already used with the marking method to determine the error correction data corresponding to the text provided on the support) of the text as read with the scanner on the support by using the error correction data extracted from the machine-readable representation as read on the support, and decoded, by means of the scanner. However, in case the scanner is further equipped with communication means (e.g. a smartphone) and can be connected to an external server, some or all the above mentioned operations of the verification method of decoding, and performing error correction of a data block can be carried out on the (dedicated) external server.

Several variants of the verification method (respectively correlated with the first and second variants of the marking method used to provide verifiable graphical data on the support) allow a user to go beyond a mere verification of the text (or, more generally, the graphical symbols) provided on the support by further checking the authenticity of the text (and/or the machine readable data).

In the first variant of the verification method of verifying human readable graphical symbols HrGS and machine-readable representation of error correction data provided on the support according to the first variant of the marking method, after having carried out the steps of said verification method (see FIG. 6), a hash function H is further programmed on the scanner processing unit to calculate a hash value of a data block (in the same way as respectively specified in the first variant of the marking method), the scanner is further connected to a scanner communication unit operable to communicate via a communication link with the ledger wherein a reference hash value $H_{ref}$ is stored (as specified in the first variant of the marking method), and the scanner processing unit further calculates, via the programmed hash function H, a scan hash value $H_{scan}$ as a hash value H(CSGDB) of the corrected scanned graphical data block CSGDB, or a hash value H(SECDB) of the scanned error correction data block SECDB, or a hash value H(portion of CDB) of any portion of a data block CDB≡(CSGDB⊕SECDB) resulting from a concatenation (CSGDB⊕SECDB) of the corrected scanned graphical data block CSGDB and the scanned error correction data block SECDB (as explained above).

The scanner further carries out the following operations:
the scanner obtains, via its communication unit (by sending a request to the ledger through the communication link and receiving back a response) the reference hash value $H_{ref}$ stored in the ledger, and
the scanner processing unit then checks whether the obtained reference hash value $H_{ref}$ matches the scan hash value $H_{scan}$; and performs at least one of the operations:
(e) it indicates a result of the checking operation (e.g. via the scanner display), or
(f) it stores a result of the checking operation in the scanner memory.

Any modification, with respect to the original (genuine) text (as human readable graphical symbols), of the human readable text provided on the support, or the content of its machine-readable error correction data provided on the support, will generate a mismatch between the reference hash value $H_{ref}$ and the scan hash value $H_{scan}$. This variant thus increases the level of trust in the conformity of the text on the support with respect to its original version.

Figure 7:
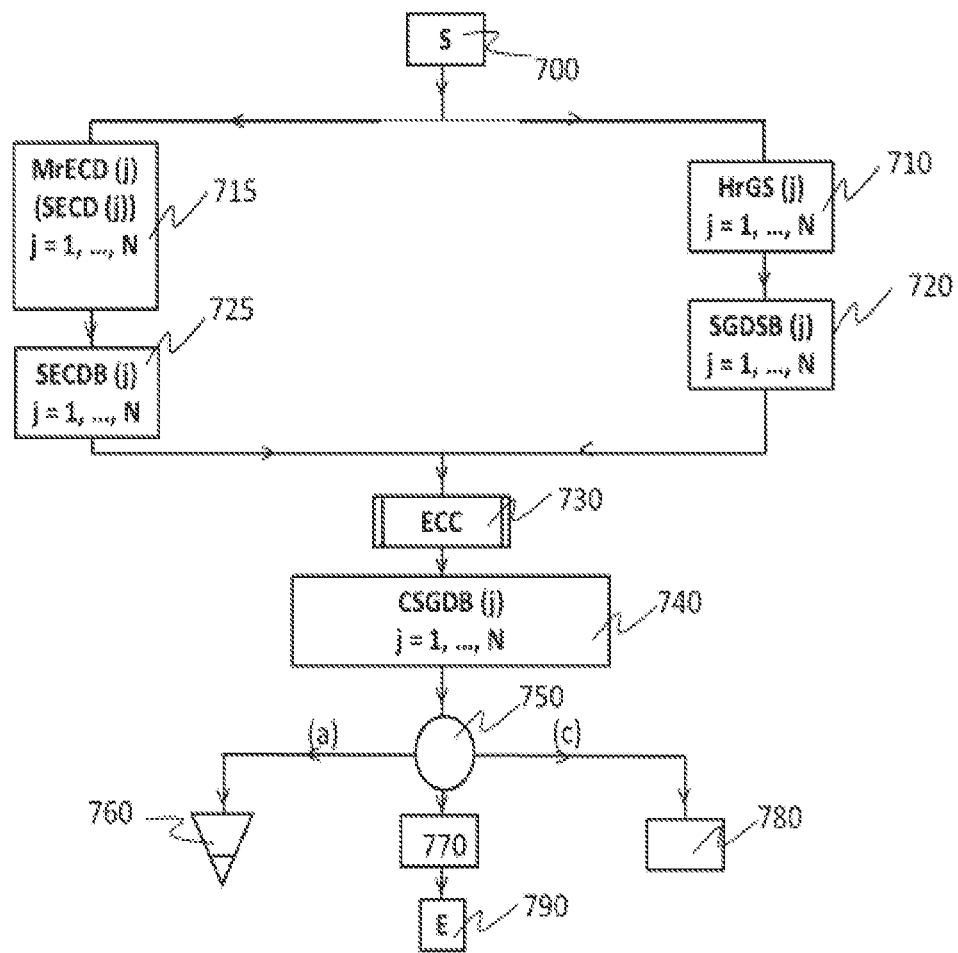
FIG. 7 is a flowchart illustrating an embodiment of the second variant of the verification method according to the invention.

The second variant of the verification method, illustrated with an embodiment shown on FIG. 7, is well suited in case the full set of graphical symbols is divided into a plurality of N subsets (with N≥2), each subset of graphical symbols being marked on a corresponding substrate part, like, for example, a text printed (according to the option (ii) of the second variant of the marking method) on a plurality of pages (e.g. the N pages of a report or a contract etc.), or displayed (according to the option (i) of the second variant of the marking method) on a screen in a given format (e.g. text document of N pages in Microsoft Word or pdf format), page by page, wherein each marked part of substrate or each displayed page shows a specific subset of human readable graphical symbols and machine-readable representation of corresponding error correction data (both being representations obtained from a corresponding specific verifiable graphical data sub-block). In the following illustrative embodiment of the second variant of the verification method (see FIG. 7), the human readable graphical symbols HrGS constitute a text that has been provided on the support according to the second variant of the marking method. For example, the text may be printed on a substrate (e.g. a paper sheet, as on FIG. 1) or electronically displayed on a screen. The imaging unit of the scanner is operable to image each page of the N pages of text on the support, i.e. each of the (verifiable) human readable graphical symbols HrGS(j) and machine-readable representation of corresponding error correction data MrECD(j) provided on the j-th page (j=1, . . . , N). The scanner processing unit is programmed to perform image processing of an image of a j-th page (j=1, . . . , N) on the support taken by the imaging unit to extract scanned text data from the imaged human readable graphical symbols HrGS(j) (i.e. the imaged graphical symbols of j-th sub-block) and obtain a digital representation of the extracted data as a corresponding scanned graphical data sub-block SGDSB(j). The scanner processing unit is also programmed to perform image processing of the image of page j on the support taken by the imaging unit, extract scanned error correction data SECD(j) from the imaged machine-readable representation of error correction data MrECD(j), by using the machine-readable decoder programmed on the scanner processing unit, and obtain a digital representation of the scanned error correction data SECD(j) as a corresponding scanned error correction data sub-block SECDSB(j). The scanner processing unit is further programmed to perform the operations of error correction of data blocks by using an error correction code ECC. The scanner may be a mere smartphone with a camera (as imaging unit) and having image processing, decoding, and error correction applications operable to run on its processing unit.

According to the above embodiment (FIG. 7) of said second variant of the verification method, wherein the human readable graphical symbols and machine-readable error correction data have been provided on the support according to the second variant of the marking method (shown on FIG. 4), the above scanner starts 700 executing for each page j (j=1, . . . , N) of the document the following operations of:

- scanning 710 with the scanner imaging unit human readable graphical symbols HrGS(j) provided on page j of the support, i.e. text 110 on text area 120 of the paper sheet 100, and obtaining 720 a corresponding scanned graphical data sub-block SGDSB(j) (i.e. a digital representation of the scanned human readable graphical symbols); and
- scanning 715 with the scanner imaging unit the machine-readable representation of error correction data MrECD (j) provided on page j of the support, i.e. the PDF417 barcode 130 on the paper sheet 100, decoding with the scanner processing unit the imaged MrECD(j), using the programmed machine-readable decoder, extracting a corresponding scanned error correction data SECD(j), and forming a corresponding scanned error correction data sub-block SECDSB(j) 725 as a digital representation of the scanned error correction data SECD(j);
- correcting 730 with the scanner processing unit the scanned graphical data sub-block SGDSB (j), by using the error correction code ECC programmed on the scanner processing unit (and using the extracted SECD (j) of the SECDSB(j)), and obtaining 740 a corrected scanned graphical data sub-block CSGDSB(j); and
- performing 750 at least one of the three options for each page j:
  - (a) displaying 760 on the scanner display a visual representation (i.e. human readable) of the corrected scanned graphical data sub-block CSGDB(j) as corresponding corrected human readable graphical symbols CGS(j); or
  - (b) indicating 770 via the scanner (e.g. on the scanner display, or with any visual or sound alarm delivered by the scanner) whether the scanned graphical data sub-block SGDB(j) contains an error (based on a result of the correction 730); or
  - (c) storing 780 scan result data specifying whether the scanned graphical data sub-block SGDB(j) contains an error (based on a result of the correction 730) in the scanner memory.

Delivering a result of the selected option(s) (a), (b) and (c) puts an end 790 to the second variant of the verification process of each page of the document. In case the scanner is further equipped with communication means (e.g. a smartphone) and can be connected to an external server, the scan result data of option (c) can be stored in a server memory via a communication link.

The invention also comprises three sub-variants of the above second variant of the verification method. In all these sub-variants, after having performed the steps of the embodiment of the second variant of the verification method shown on FIG. 7, a one-way function, here the hash function H, is further programmed on the scanner processing unit to calculate a hash value of a data block (in the same way as respectively specified in the variants of the marking method), and the scanner processing unit further calculates, via the programmed hash function H, N scan sub-block hash values $H_{scan}(j)$ (j=1, . . . , N), each scan sub-block hash value $H_{scan}(j)$ being a hash value as a hash H(CSGDSB(j)) of the j-th corrected scanned graphical data sub-block CSGDSB(j), or a hash value H(SECDSB(j)) of the j-th scanned error correction data sub-block SECDSB(j), or a hash value H(portion of CDB(j)) of any portion of a data block CDB (j)≡(CSGDSB(j)⊕SECDSB(j)) resulting from a concatenation (CSGDSB(j)⊕SECDSB(j)) of the j-th corrected scanned graphical data sub-block CSGDB(j) and the j-th scanned error correction data sub-block SECDSB(j). The use of the calculated scan sub-block hash values $H_{scan}(j)$ is specific in each of said first, second and third sub-variants of the second variant of the verification method, as detailed below.

In an embodiment of the first sub-variant of the embodiment of the second variant of the verification method, wherein the human readable graphical symbols HrGS(j) and the machine-readable error correction data MrECD(j) on the support have been generated according to the first sub-variant of the second variant of the marking method, the hash function and the error correction code are programmed on the scanner processing unit, and the scanner is further operable to read and decode machine-readable representation of a sub-block hash value H(j) on the support via the scanner processing unit. Moreover, the scanner is connected to a scanner communication unit operable to communicate, via a communication link, with the ledger wherein a reference aggregated hash value is stored. The scanner calculates (see above) the scan sub-block hash values $H_{scan}(j)$, j=1, . . . , N, in case it is possible (i.e. if all the HrGS(j) and MrECD(j) are readable). In case it is not possible to calculate a scan sub-block hash value for some page j, for example because the HrGS(j) and MrECD(j) on this j-th page are not readable, the scanner scans and decodes a machine-readable representation MrH(j) of a sub-block hash value H(j) on this j-th page of the support and obtains a corresponding decoded sub-block hash value DH(j): this decoded sub-block hash value will then serve as scan sub-block hash value, i.e. $H_{scan}(j)=DH(j)$, for the j-th page. This machine-readable representation of a j-th sub-block hash value MrH(j) is associated with the verifiable graphical data sub-block VGDSB(j) corresponding to human readable graphical symbols HrGS(j) and machine-readable representation of error correction data MrECD(j) provided on the support. As a result, all the sub-block scan hash values necessary to calculate an aggregated hash value for all the pages of the support are available, (either as calculated scan hash values $H_{scan}(j)$ or as identified with decoded hash values DH(j)).

The scanner processing unit then executes the further operations of:

- calculating an aggregated scan hash value $H_{scan}$ by concatenating all the obtained scan hash values (the symbol ⊕ represents a concatenation operator):

$$H_{scan}=H_{scan}(1)\oplus H_{scan}(2)\oplus \ldots \oplus H_{scan}(N-1)\oplus H_{scan}(N).$$

- sending via the scanner communication unit, through the communication link, a request for a reference aggregated hash value to the ledger and receiving back a reference aggregated hash value $H_{ref}$;
- checking whether the received reference aggregated hash value $H_{ref}$ matches the aggregated scan value $H_{scan}$, and indicating a result of the checking operation (e.g. via a message on the scanner display). In case of matching, the pages are all genuine (i.e. conform with the original ones), even if the text and the machine-readable error correction data of some page(s) were not readable (the machine-readable representations of the sub-block hash values being however readable). In case of mismatch, at least one of the pages has been modified (e.g. at least one of the graphical symbols is altered or fake): it is then possible to retrieve such a page by checking whether the scan sub-block hash values Hscan(j) obtained from the sub-block data HrGS(j) and MrECD (j), and the corresponding decoded hash values DH(j), j=1, . . . , N, matches.

This sub-variant allows to independently check with a scanner whether each page of the document of N pages is genuine with the help of the scan of a mere machine-readable representation of a sub-block hash value of limited size.

In an embodiment of the second sub-variant of the second variant of the verification method, the human readable graphical symbols HrGS(j), (j=1, . . . , N) and the machine-readable error correction data MrECD(j) on page j (of a document of N pages) on the support have been generated according to the second sub-variant of the second variant of the marking method, option (iii), the scanner is connected to a scanner communication unit operable to communicate via a communication link with the ledger containing the reference aggregated hash value $H_{ref}$ (as root node value of a tree, see FIG. 5), the hash function (the same as used for calculating the N sub-block hash values H(j) and the corresponding reference aggregated hash value $H_{ref}$) is programmed on the scanner processing unit. The scanner is further operable to read and decode a machine-readable representation MrVPK(j) (j=1, . . . , N) of a sub-block verification path key VPK(j) on the support and calculate an aggregated scan hash value $H_{scan}$ from a pair of corresponding sub-block hash value H(j) and sub-block verification path key VPK(j) scanned on the support (here, we consider the case N=8, with a binary tree corresponding to the example of FIG. 5 for a document of 8 pages). After having calculated with the hash function (see above) the scan sub-block hash value $H_{scan}(j)$, (j∈{1, . . . , N}) from the scanned verifiable graphical data on page j of the document of N pages and in accordance with the second sub-variant of the second variant of the marking method (i.e. with the same selected choice of H(CSGDSB(j)), or H(SECDSB(j) or H(portion of CDB(j) for calculating a sub-block hash value, used as leaf nodes of the tree), the scanner executes the further operations of:

scanning a machine-readable representation MrVPK(j) of a sub-block verification path key VPK(j) on a j-th page of the support (corresponding to a j-th corrected scanned graphical data sub-block CSGDSB(j)), and extracting a corresponding scanned sub-block verification path key SVPK(j) via the scanner processing unit;

calculating with the scanner processing unit a scan aggregated hash value $H_{scan}$ with the calculated scan sub-block hash value $H_{scan}(j)$ and the scanned sub-block verification path key SVPK(j) obtained by scanning the j-th page of the document, as explained below:

If j=1 (first page of the document), and as explained above regarding the embodiment of the second sub-variant of the second variant of the marking method (see also the illustrative binary tree on FIG. 5), the sub-block hash value $H_{scan}(1)$ having been obtained as indicated above (i.e. from the first corrected scanned graphical data sub-block CSGDB(1) and/ or the first scanned error correction data sub-block SECDSB (1)) is considered as the value of the first leaf node a(1,1) of the binary tree (the same ordering of the nodes and tree concatenation ordering is selected as in the above embodiment of the second sub-variant of the second variant of the marking method), the extracted scanned sub-block verification path key SVPK(1) contains three node values: SVPK (1)={a(1,2),a(2,2),a(3,2)}, thus, the scan hash value $H_{scan}$ that can be obtained from the scan of the verifiable graphical data of the first page is calculated as $H_{scan}=H(H(H(a(1,1)\oplus a(1,2))\oplus a(2,2))\oplus a(3,2))=H(H(H(H_{scan}(1)\oplus a(1,2))\oplus a(2,2))\oplus a(3,2))$ If j=2, with SVPK(2)={a(1,1), a(2,2), a(3,2)}, $H_{scan}=H(H(H(a(1,1)\oplus H_{scan}(2))\oplus a(2,2))\oplus a(3,2))$ If j=3, with SVPK(3)={a(1,4),a(2,1),a(3,2)}, $H_{scan}=H(H(a(2,1)\oplus H(H_{scan}(3)\oplus a(1,4)))\oplus a(3,2))$ If j=4, with SVPK(4)={a(1,3),a(2,1),a(3,2)}

$H_{scan}H(H(a(2,1)\oplus H(a(1,3)\oplus H_{scan}(4)))\oplus a(3,2))$

If j=5, with SVPK(5)={a(1,6),a(2,4),a(3,1)}

$H_{scan}=H(a(3,1)\oplus H(H(H_{scan}(5)\oplus a(1,6))\oplus a(2,4)))$

If j=6, with SVPK(6)={a(1,5),a(2,4),a(3,1)}

$H_{scan}=H(a(3,1)\oplus H(H(a(1,5)\oplus H_{scan}(6))\oplus a(2,4)))$

If j=7, with SVPK(7)={a(1,8),a(2,3),a(3,1)}, $H_{scan}=H(a(3,1)\oplus H(a(2,3)\oplus H(H_{scan}(7)\oplus a(1,8))))$ If j=8, with SVPK(8)={a(1,7),a(2,3),a(3,1)}, $H_{scan}=H(a(3,1)\oplus H(a(2,3)\oplus H(a(1,7)\oplus H_{scan}(8))))$.

next, obtaining the reference aggregated hash value $H_{ref}$ (i.e. the root node value R of the tree) stored in the ledger, via the scanner communication unit and the communication link, and checking whether the obtained reference aggregated hash value $H_{ref}$ matches the scan aggregated hash value $H_{scan}$, for j=1, . . . , N; and indicating a result of the checking operation (e.g. on the scanner display).

This sub-variant of the verification method allows to detect any error on each page of a document with only a small amount of data, as any variation in a content of a page results in a mismatch between the reference aggregated hash value $H_{ref}$ and the scan hash value $H_{scan}$ obtained from the verifiable graphical data scanned on this page. Moreover, this method is robust as the corrected version of the scanned graphical data is used for calculating the sub-block hash values $H_{scan}(j)$ of a j-th page, j=1, . . . , N.

In an embodiment of the third sub-variant of the second variant of the verification method, we use the same binary tree of a document of N=8 pages as well as the same way of calculating the scan sub-block hash values $H_{scan}(j)$ (j=1, . . . , N) and scan hash values $H_{scan}$ as in the above example of the second sub-variant of the second variant of the verification method. In this embodiment, the human readable graphical symbols HrGS(j) and the machine-readable error correction data MrECD(j) on the support have been generated according to the second sub-variant of the second variant of the marking method, option (iv), the reference aggregated hash value $H_{ref}$ is stored in the scanner memory, and the scanner is also operable to read and decode machine-readable representation of a sub-block verification path key VPK(j) on the support and calculate an aggregated hash value $H_{scan}(j)$ from a pair of corresponding sub-block hash value and sub-block verification path key. According to this embodiment, after having performed the steps of said second variant of the verification method and calculated a scan sub-block hash value $H_{scan}(j)$ (j=1, . . . , N) as mentioned above, the scanner executes the further steps of:

scanning with the scanner a machine-readable representation MrVPK(j) of a sub-block verification path key VPK(j) on the j-th page provided on the support (corresponding to a j-th corrected scanned graphical data sub-block CSGDSB(j), e.g. obtained from the scanned verifiable graphical data provided on the j-th page of the document), and extracting a corresponding scanned sub-block verification path key SVPK(j) via the scanner processing unit;

calculating a scan aggregated hash value $H_{scan}$ with the calculated scan sub-block hash value $H_{scan}(j)$ and the scanned sub-block verification path key SVPK(j) obtained by scanning the j-th page of the document (see above, the detailed calculation relating to the second sub-variant of the embodiment of the second variant of the verification method);

obtaining the reference aggregated hash value $H_{ref}$ stored in the scanner memory;

checking via the scanner processing unit whether the obtained reference aggregated hash value $H_{ref}$ matches the aggregated scan hash value $H_{scan}$ for the j-th page (j=1, . . . , N); and indicating a result of the checking operation (via the scanner display).

This sub-variant of the verification method allows to detect in a robust offline mode any error on each page of a document with only a small amount of data, as any variation in a content of a page results in a mismatch between the reference aggregated hash value $H_{ref}$ and the scan hash value $H_{scan}$ obtained from the verifiable graphical data scanned on this page. Indeed, the method only uses data (of limited size) stored in the scanner memory (i.e. $H_{ref}$) for checking whether the reference aggregated hash value $H_{ref}$ matches the scan hash value $H_{scan}$.

An embodiment of the alternative variant of the verification method, illustrates an application of the invention to the verification human readable graphical symbols and corresponding machine-readable error correction data generated in a computer connected to a display by a processor programmed to perform the steps of the above mentioned marking method, option (i). The computer has a scan application programmed on its processor that is operable to scan displayed human readable graphical symbols and machine-readable error correction data.

The computer thus displays the generated human readable graphical symbols HrGS and corresponding machine-readable error correction data MrECD, and the scan application running on the computer processor then performs the following operations of:

scanning the displayed human readable graphical symbols HrGS to obtain a scanned graphical data block SGDB, this scanned graphical data block being a digital representation of the scanned human readable graphical symbols;

scanning the displayed machine-readable error correction data MrECD and, via a machine-readable decoder of the scan application running on the computer processor, decoding the scanned machine-readable error correction data MrECD to obtain corresponding scanned error correction data SECD in a scanned error correction data block SECDB;

correcting the scanned graphical data block SGDB with an error correction code ECC of the scan application running on the computer processor, using the scanned error correction data SECD of the scanned error correction data block SECDB, to obtain a corresponding corrected scanned graphical data block CSGDB; and performing at least one of the following steps:
(a) displaying a visual representation of the corrected scanned graphical data block CSGDB as corrected human readable graphical symbols CHrGS on the display, or
(b) displaying an indication specifying whether the scanned graphical data block SGDB contains an error (based on the result of the correction step of SGDB), or
(c) storing scan result data specifying whether the scanned graphical data block SGDB contains an error in a memory of the computer.

At step (a), the parts of the initially displayed human readable graphical symbols HrGS (before running the scan application) which have been corrected via the scan application are preferably highlighted to facilitate identification and location of errors in the initially displayed HrGS by a user of the computer.

The above disclosed subject matter is to be considered illustrative, and not restrictive, and serves to provide a better understanding of the invention defined by the independent claims.

The invention claimed is:

1. A method of authenticating human readable textual characters provided together with machine-readable representation of error correction data on a support, comprising the steps of:

securing textual data against forgery and tampering, comprising the steps of:
storing in a memory of a processing unit a textual data block containing a digital representation of a given finite set of textual characters of the textual data;
processing with the processing unit the digital representation of textual characters of the stored textual data block with an error correction code programmed in the processing unit to generate error correction data in a corresponding error correction data block;
formatting the textual data block and the error correction data block with the processing unit to respectively provide, in a human readable textual data block, a human readable representation of the textual characters of the textual data block and, in a machine-readable error correction data block, a machine-readable representation of the error correction data of the error correction data block separate from the human readable representation of the textual characters of the textual data block, to obtain a corresponding authenticatable textual data block comprising said human readable textual data block and said machine-readable error correction data block; and
(i) displaying human readable textual characters and corresponding machine-readable representation of error correction data of the obtained authenticatable textual data block on the support being a display connected to the processing unit, or
(ii) marking on the support being a substrate, via a marking device connected to the processing unit and equipped with a control unit operable to control the operation of marking based on data received from the processing unit, human readable textual characters and corresponding machine-readable representation of error correction data of the obtained authenticatable textual data block received from the processing unit,
    thereby providing on the support authentication data comprising the human readable textual characters and the corresponding machine-readable error correction data;
scanning with a scanner, equipped with an imaging unit, a scanner processing unit having a scanner memory and connected to a scanner display, the human readable textual characters on the support to obtain, via image processing of the scanned human readable textual characters, a scanned textual data block being a digital representation of said scanned human readable textual characters;
scanning with the scanner machine-readable representation of error correction data on the support to obtain, via machine-readable decoder programmed on the scanner processing unit, corresponding scanned error correction data in a scanned error correction data block, the scanned error correction data block being a digital representation of said scanned error correction data;
correcting the scanned textual data block with an error correction code programmed on the scanner processing unit using the scanned error correction data of the scanned error correction data block to obtain a corresponding corrected scanned textual data block;
displaying a visual representation of the corrected scanned textual data block as corresponding corrected human readable textual characters on the scanner display and comparing the displayed visual representation of the corrected scanned textual data block with the human readable textual characters provided on the support; and
detecting any alteration or fraud when the displayed visual representation of the corrected scanned textual data block is different from the human readable textual characters as a result of the comparison;
wherein the human readable textual characters and the machine-readable error correction data on the support have been generated by calculating with a hash function programmed on the processing unit a hash value of any portion of a data block resulting from a concatenation of the textual data block and the error correction data block; and storing the calculated hash value as a reference hash value in a ledger, the hash function being programmed on the scanner processing unit, and the scanner being connected to a scanner communication unit operable to communicate via a communication link with the ledger, the method comprising the further steps of:
    calculating with a hash function programmed on the processing unit a hash value of any portion of a data block resulting from a concatenation of the textual data block and the error correction data block; and storing the calculated hash value as a reference hash value in a ledger, with the hash function programmed on the scanner processing unit a scan hash value of the corrected scanned textual data block, or the scanned error correction data block, or any portion of a data block resulting from a concatenation of the corrected scanned textual data block and the scanned error correction data block;
    obtaining the reference hash value stored in the ledger via the scanner communication unit and the communication link, and checking whether the obtained reference hash value matches the scan hash value; and (e) indicating a result of the checking operation, or
(f) storing a result of the checking operation in the scanner memory.

2. The method according to claim 1, wherein the human readable textual characters and the machine-readable error correction data on the support have been generated according to a method wherein the support comprises a plurality of parts and the authenticatable textual data block is split into a same plurality of authenticatable textual data sub-blocks, and the corresponding human readable textual characters and machine-readable representation of error correction data are accordingly spread together on corresponding parts of the support, by the following steps:
    the textual data block is split into a plurality of textual data sub-blocks, and each textual data sub-block is formatted to provide a human readable representation of its textual characters in a corresponding human readable textual data sub-block;
    for each textual data sub-block, the digital representation of its textual characters is extracted and processed with the error correction code to generate corresponding error correction data in an error correction data sub-block;
    each error correction data sub-block is formatted to provide in a corresponding machine-readable error correction data sub-block a machine-readable representation of corresponding error correction data separate from the human readable representation of textual characters of the corresponding human readable textual data sub-block, to obtain a corresponding authenticatable textual data sub-block comprising said human readable textual data sub-block and said machine-readable error correction data sub-block; and
    at step (i), displaying human readable textual characters and corresponding machine-readable representation of error correction data of each obtained authenticatable textual data sub-block on the display, or
    at step (ii), marking on the substrate, via the marking device, human readable textual characters and corresponding machine-readable representation of error correction data of each authenticatable textual data sub-block received by the control unit from the processing unit, thereby providing on the support, for each textual data sub-block of the textual data block, corresponding human readable textual characters together with corresponding machine-readable error correction data that are authenticatable by a user, wherein:
    the operation of scanning the human readable textual characters on the support comprises scanning of the sub-block textual characters of the corresponding textual data sub-block to obtain via image processing corresponding scanned textual data sub-block as a digital representation of the scanned sub-block textual characters;
    the operation of scanning the machine-readable error correction data on the support comprises scanning of the error correction data of the corresponding error correction data sub-block to obtain corresponding scanned error correction data sub-block;
    the operation of correcting the scanned textual data block comprises correcting the textual data of the scanned textual data sub-block, using the corresponding scanned error correction data sub-block, to obtain corresponding corrected scanned textual data sub-block; and the operation of displaying a visual representation of the corrected scanned data block comprises displaying a visual representation of the corrected scanned textual data sub-block.

3. The method according to claim 2, wherein the human readable textual characters and the machine-readable error correction data on the support have been generated according to a method wherein the support comprises a plurality of parts and the authenticatable textual data block is split into a same plurality of authenticatable textual data sub-blocks, and the corresponding human readable textual characters and machine-readable representation of error correction data are accordingly spread together on corresponding parts of the support, by the following steps:

the textual data block is split into a plurality of textual data sub-blocks, and each textual data sub-block is formatted to provide a human readable representation of its textual characters in a corresponding human readable textual data sub-block;

for each textual data sub-block, the digital representation of its textual characters is extracted and processed with the error correction code to generate corresponding error correction data in an error correction data sub-block;

each error correction data sub-block is formatted to provide in a corresponding machine-readable error correction data sub-block a machine-readable representation of corresponding error correction data separate from the human readable representation of textual characters of the corresponding human readable textual data sub-block, to obtain a corresponding authenticatable textual data sub-block comprising said human readable textual data sub-block and said machine-readable error correction data sub-block; and at step (i), displaying human readable textual characters and corresponding machine-readable representation of error correction data of each obtained authenticatable textual data sub-block on the display, or at step (ii), marking on the substrate, via the marking device, human readable textual characters and corresponding machine-readable representation of error correction data of each authenticatable textual data sub-block received by the control unit from the processing unit, thereby providing on the support, for each textual data sub-block of the textual data block, corresponding human readable textual characters together with corresponding machine-readable error correction data that are authenticatable by a user, wherein a sub-block hash value is calculated via a hash function programmed on the processing unit for each textual data sub-block, or the corresponding error correction data sub-block, or any portion of a data sub-block resulting from a concatenation of said textual data sub-block and said error correction data sub-block;

for each sub-block hash value, a corresponding machine-readable representation of said sub-block hash value is calculated;

associated with each authenticatable textual data sub-block, the corresponding machine-readable representation of the sub-block hash value is further provided on the corresponding part of the support;

a reference aggregated hash value of all the sub-block hash values is determined as a concatenation of all the calculated sub-block hash values; and the reference aggregated hash value is stored in a ledger, thereby providing on the support, for each textual data sub-block of the textual data block, corresponding human readable textual characters together with corresponding machine-readable error correction data that are authenticatable by a user, the hash function and the error correction code being programmed on the scanner processing unit, and the scanner being further operable to read and decode machine-readable representation of a sub-block hash value on the support via the scanner processing unit, the scanner being connected to a scanner communication unit operable to communicate via a communication link with the ledger, comprising the further steps of:

calculating for each part of the support, with the hash function programmed on the scanner processing unit and in accordance with the operations carried out for calculating a sub-block hash value, a scan sub-block hash value of the corresponding corrected scanned textual data sub-block, or the corresponding scanned error correction data sub-block, or any portion of a data sub-block resulting from a concatenation of said corrected scanned textual data sub-block and said scanned error correction data sub-block;

in case it is not possible to calculate a scan sub-block hash value for a part of the support, scanning and decoding a machine-readable representation of a sub-block hash value on said part of the support to obtain a corresponding decoded sub-block hash value, and using this decoded sub-block hash value as scan sub-block hash value for this part of the support;

calculating an aggregated scan hash value as a concatenation of all the scan sub-block hash values;

obtaining the reference aggregated hash value stored in the ledger via the scanner communication unit and the communication link, and checking whether the obtained reference aggregated hash value matches the aggregated scan hash value; and indicating a result of the checking operation via the scanner.

4. The method according to claim 2, wherein the human readable textual characters and the machine-readable error correction data on each part of the support have been generated according to a method wherein the support comprises a plurality of parts and the authenticatable textual data block is split into a same plurality of authenticatable textual data sub-blocks, and the corresponding human readable textual characters and machine-readable representation of error correction data are accordingly spread together on corresponding parts of the support, by the following steps:

the textual data block is split into a plurality of textual data sub-blocks, and each textual data sub-block is formatted to provide a human readable representation of its textual characters in a corresponding human readable textual data sub-block;

for each textual data sub-block, the digital representation of its textual characters is extracted and processed with the error correction code to generate corresponding error correction data in an error correction data sub-block;

each error correction data sub-block is formatted to provide in a corresponding machine-readable error correction data sub-block a machine-readable representation of corresponding error correction data separate from the human readable representation of textual characters of the corresponding human readable textual data sub-block, to obtain a corresponding authenticatable textual data sub-block comprising said human readable textual data sub-block and said machine-readable error correction data sub-block; and at step (i), displaying human readable textual characters and corresponding machine-readable representation of error correction data of each obtained authenticatable textual data sub-block on the display, or at step (ii), marking on the substrate, via the marking device, human readable textual characters and corresponding machine-readable representation of error correction data of each authenticatable textual data sub-block received by the control unit from the processing unit, thereby providing on the support, for each textual data sub-block of the textual data block, corresponding human readable textual characters together with corresponding machine-readable error correction data that are authenticatable by a user, wherein a sub-block hash value is calculated via a hash function programmed on the processing unit for each textual data sub-block, or the corresponding error correction data sub-block, or any portion of a data sub-block resulting from a concatenation of said textual data sub-block and said error correction data sub-block;

a reference aggregated hash value of all the sub-block hash values is determined as a root node value of a tree having the calculated sub-block hash values as leaf node values, the tree comprising nodes arranged according to a given nodes ordering in the tree, said tree comprising node levels from the leaf nodes to the root node, every non-leaf node value of the tree corresponding to a hash value of a concatenation of the respective node values of its child nodes according to a tree concatenation ordering, the root node value corresponding to a hash value of a concatenation of the node values of the nodes of a penultimate nodes level in the tree according to said tree concatenation ordering;

for each sub-block hash value, an associated sub-block verification path key is determined as a series of hash values of selected non-leaf nodes of the tree necessary to retrieve the root node value from said sub-block hash value;

a machine-readable representation of each sub-block verification path key is included, associated with the respectively corresponding textual data sub-block and error correction data sub-block, in the authenticatable textual data sub-block, the authenticatable textual data sub-block being further formatted to provide a machine-readable representation of said sub-block verification path key separate from the human readable representation of the associated textual data sub-block and the machine-readable representation of the associated error correction data sub-block; and (iii) the reference aggregated hash value is stored in a ledger, or (iv) making the reference aggregated hash value available to a user, thereby providing on the support, for each textual data sub-block of the textual data block, corresponding human readable textual characters together with corresponding machine-readable error correction data that are authenticatable by a user, the reference aggregated hash value being stored in the ledger, the scanner being connected to a scanner communication unit operable to communicate via a communication link with the ledger, and the scanner being further operable to read and decode machine-readable representation of a sub-block verification path key on a corresponding part of the support and calculate an aggregated hash value from a pair of corresponding sub-block hash value and sub-block verification path key, comprising the further steps of:

calculating, with the hash function programmed in the scanner processing unit and in accordance with the operations carried out for calculating a sub-block hash value, a scan sub-block hash value of a selected corrected scanned textual data sub-block, or a corresponding scanned error correction data sub-block, or any portion of a data sub-block resulting from a concatenation of the corrected scanned textual data sub-block and the scanned error correction data sub-block;

scanning with the scanner a machine-readable representation of a sub-block verification path key, corresponding to the selected corrected scanned textual data sub-block, on a corresponding part of the support, and extracting a corresponding scanned sub-block verification path key;

calculating a scan aggregated hash value with the calculated scan sub-block hash value and the scanned sub-block verification path key;

obtaining the reference aggregated hash value stored in the ledger via the scanner communication unit and the communication link, and checking whether the obtained reference aggregated hash value matches the scan aggregated hash value; and indicating a result of the checking operation via the scanner.

5. The method according to claim 2, wherein the human readable textual characters and the machine-readable error correction data on the support have been generated according to a method wherein the support comprises a plurality of parts and the authenticatable textual data block is split into a same plurality of authenticatable textual data sub-blocks, and the corresponding human readable textual characters and machine-readable representation of error correction data are accordingly spread together on corresponding parts of the support, by the following steps:

the textual data block is split into a plurality of textual data sub-blocks, and each textual data sub-block is formatted to provide a human readable representation of its textual characters in a corresponding human readable textual data sub-block;

for each textual data sub-block, the digital representation of its textual characters is extracted and processed with the error correction code to generate corresponding error correction data in an error correction data sub-block;

each error correction data sub-block is formatted to provide in a corresponding machine-readable error correction data sub-block a machine-readable representation of corresponding error correction data separate from the human readable representation of textual characters of the corresponding human readable textual data sub-block, to obtain a corresponding authenticatable textual data sub-block comprising said human readable textual data sub-block and said machine-readable error correction data sub-block; and at step (i), displaying human readable textual characters and corresponding machine-readable representation of error correction data of each obtained authenticatable textual data sub-block on the display, or at step (ii), marking on the substrate, via the marking device, human readable textual characters and corresponding machine-readable representation of error correction data of each authenticatable textual data sub-block received by the control unit from the processing unit, thereby providing on the support, for each textual data sub-block of the textual data block, corresponding human readable textual characters together with corresponding machine-readable error correction data that are authenticatable by a user, wherein a sub-block hash value is calculated via a hash function programmed on the processing unit for each textual data sub-block, or the corresponding error correction data sub-block, or any portion of a data sub-block resulting from a concatenation of said textual data sub-block and said error correction data sub-block;

a reference aggregated hash value of all the sub-block hash values is determined as a root node value of a tree having the calculated sub-block hash values as leaf node values, the tree comprising nodes arranged according to a given nodes ordering in the tree, said tree comprising node levels from the leaf nodes to the root node, every non-leaf node value of the tree corresponding to a hash value of a concatenation of the respective node values of its child nodes according to a tree concatenation ordering, the root node value corresponding to a hash value of a concatenation of the node values of the nodes of a penultimate nodes level in the tree according to said tree concatenation ordering;

for each sub-block hash value, an associated sub-block verification path key is determined as a series of hash values of selected non-leaf nodes of the tree necessary to retrieve the root node value from said sub-block hash value;

a machine-readable representation of each sub-block verification path key is included, associated with the respectively corresponding textual data sub-block and error correction data sub-block, in the authenticatable textual data sub-block, the authenticatable textual data sub-block being further formatted to provide a machine-readable representation of said sub-block verification path key separate from the human readable representation of the associated textual data sub-block and the machine-readable representation of the associated error correction data sub-block; and (iii) the reference aggregated hash value is stored in a ledger, or (iv) making the reference aggregated hash value available to a user, thereby providing on the support, for each textual data sub-block of the textual data block, corresponding human readable textual characters together with corresponding machine-readable error correction data that are authenticatable by a user, the reference aggregated hash value available to the user being stored in the scanner memory, and the scanner being further operable to read and decode machine-readable representation of a sub-block verification path key on a corresponding part of the support and calculate an aggregated hash value from a pair of corresponding sub-block hash value and sub-block verification path key, comprising the further steps of:

calculating, with the hash function programmed in the scanner processing unit and in accordance with the operations carried out for calculating a sub-block hash value, a scan sub-block hash value of a selected corrected scanned textual data sub-block, or a corresponding scanned error correction data sub-block, or any portion of a data sub-block resulting from a concatenation of the corrected scanned textual data sub-block and the scanned error correction data sub-block;

scanning with the scanner a machine-readable representation of a sub-block verification path key, corresponding to the selected corrected scanned textual data sub-block, on a corresponding part of the support, and extracting a corresponding scanned sub-block verification path key;

scanning on the support a reference aggregated hash value to obtain a scanned reference aggregated hash value;

calculating an aggregated scan hash value with the calculated scan sub-block hash value and the scanned sub-block verification path key;

checking whether the reference aggregated hash value stored in the scanner memory matches the aggregated scan hash value; and indicating a result of the checking operation via the scanner.

6. A method of authenticating human readable textual characters provided together with machine-readable error correction data on a display of a scanner, the scanner having a scan application programmed on a processor operable to scan displayed human readable textual characters and machine-readable error correction data, comprising the steps of:

securing textual data against forgery and tampering, comprising the steps of:

storing in a memory of a processing unit of the scanner a textual data block containing a digital representation of a given finite set of textual characters of the textual data;

processing with the processing unit the digital representation of textual characters of the stored textual data block with an error correction code programmed in the processing unit to generate error correction data in a corresponding error correction data block;

formatting the textual data block and the error correction data block with the processing unit to respectively provide, in a human readable textual data block, a human readable representation of the textual characters of the textual data block and, in a machine-readable error correction data block, a machine-readable representation of the error correction data of the error correction data block separate from the human readable representation of the textual characters of the textual data block, to obtain a corresponding authenticatable textual data block comprising said human readable textual data block and said machine-readable error correction data block; and (i) displaying human readable textual characters and corresponding machine-readable representation of error correction data of the obtained authenticatable textual data block on the support being a display connected to the processing unit, or (ii) marking on the support being a substrate, via a marking device connected to the processing unit and equipped with a control unit operable to control the operation of marking based on data received from the processing unit, human readable textual characters and corresponding machine-readable representation of error correction data of the obtained authenticatable textual data block received from the processing unit, thereby providing on the support authentication data comprising the human readable textual characters and the corresponding machine-readable error correction data;

scanning the displayed human readable textual characters, via the scan application running on the scanner processor, to obtain a scanned textual data block being a digital representation of the scanned human readable textual characters;

scanning the displayed machine-readable error correction data and, via a machine-readable decoder of the scan application running on the scanner processor, decoding the scanned machine-readable error correction data to obtain corresponding scanned error correction data in a scanned error correction data block;

correcting the scanned textual data block with an error correction code of the scan application running on the scanner processor, using the scanned error correction data of the scanned error correction data block, to obtain a corresponding corrected scanned textual data block;

displaying a visual representation of the corrected scanned textual data block as corrected human readable textual characters on the display and comparing the displayed visual representation of the corrected scanned textual data block with the human readable textual characters provided on the display; and detecting any alteration or fraud when the displayed visual representation of the corrected scanned textual data block is different from the human readable textual characters as a result of the comparison; wherein the human readable textual characters and the machine-readable error correction data on the support have been generated by calculating with a hash function programmed on the processing unit a hash value of any portion of a data block resulting from a concatenation of the textual data block and the error correction data block; and storing the calculated hash value as a reference hash value in a ledger, the hash function being programmed on the scanner processing unit, and the scanner being connected to a scanner communication unit operable to communicate via a communication link with the ledger, the method comprising the further steps of:

calculating with a hash function programmed on the processing unit a hash value of any portion of a data block resulting from a concatenation of the textual data block and the error correction data block; and storing the calculated hash value as a reference hash value in a ledger, with the hash function programmed on the scanner processing unit a scan hash value of the corrected scanned textual data block, or the scanned error correction data block, or any portion of a data block resulting from a concatenation of the corrected scanned textual data block and the scanned error correction data block;

obtaining the reference hash value stored in the ledger via the scanner communication unit and the communication link, and checking whether the obtained reference hash value matches the scan hash value; and (e) indicating a result of the checking operation, or (f) storing a result of the checking operation in the scanner memory.

7. A scanner equipped with an imaging unit, a scanner processing unit and a scanner display, wherein the scanner processing unit is programmed to make the scanner operable to implement the steps of the method according to claim 1, wherein the scanner is equipped with a scanner communication unit operable to communicate via a communication link with a ledger, wherein the scanner processing unit is further programmed to make the scanner operable to implement the steps of a method wherein the human readable textual characters and the machine-readable error correction data on the support have been generated by calculating with a hash function programmed on the processing unit a hash value of any portion of a data block resulting from a concatenation of the textual data block and the error correction data block; and storing the calculated hash value as a reference hash value in a ledger, the hash function being programmed on the scanner processing unit, and the scanner being connected to a scanner communication unit operable to communicate via a communication link with the ledger, comprising the further steps of:

calculating with a hash function programmed on the processing unit a hash value of any portion of a data block resulting from a concatenation of the textual data block and the error correction data block; and storing the calculated hash value as a reference hash value in a ledger, with the hash function programmed on the scanner processing unit a scan hash value of the corrected scanned textual data block, or the scanned error correction data block, or any portion of a data block resulting from a concatenation of the corrected scanned textual data block and the scanned error correction data block;

obtaining the reference hash value stored in the ledger via the scanner communication unit and the communication link, and checking whether the obtained reference hash value matches the scan hash value; and (e) indicating a result of the checking operation, or (f) storing a result of the checking operation in the scanner memory.

8. A non-transitory computer-readable storage medium storing a computer program product operable, when running on a scanner equipped with a processor, a memory and a display, to implement the steps of the method according to claim 6 to authenticate human readable textual characters provided together with machine-readable error correction data on the display.

* * * * *